United States Patent
Bauchot et al.

(10) Patent No.: US 9,103,677 B2
(45) Date of Patent: Aug. 11, 2015

(54) GENERATING OPTIMAL ITINERARIES BASED ON NETWORK CONNECTIVITY

(71) Applicant: International Business Machines Corporation, Armonk, NY (US)

(72) Inventors: Frederic Bauchot, Saint-Jeannet (FR); Jean-Claude Dispensa, Saint-Jeannet (FR); Francois-Xavier Drouet, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 13/732,464

(22) Filed: Jan. 2, 2013

(65) Prior Publication Data

US 2013/0124087 A1    May 16, 2013

Related U.S. Application Data

(62) Division of application No. 12/339,156, filed on Dec. 19, 2008, now Pat. No. 8,352,175.

(51) Int. Cl.
*G01C 21/00* (2006.01)
*G01C 21/34* (2006.01)

(52) U.S. Cl.
CPC ............ *G01C 21/00* (2013.01); *G01C 21/3461* (2013.01)

(58) Field of Classification Search
USPC ........................................................ 701/408
See application file for complete search history.

(56) References Cited

U.S. PATENT DOCUMENTS

| | | | |
|---|---|---|---|
| 5,392,052 A | 2/1995 | Eberwine | |
| 5,915,214 A | 6/1999 | Reece et al. | |
| 5,948,040 A | 9/1999 | DeLorme et al. | |
| 6,009,403 A | 12/1999 | Sato | |
| 6,038,444 A | 3/2000 | Schipper et al. | |
| 6,125,278 A | 9/2000 | Wieczorek et al. | |
| 6,873,850 B2 * | 3/2005 | Dowling et al. | ........... 455/456.1 |
| 7,130,742 B2 | 10/2006 | Kobuya et al. | |
| 7,171,220 B2 | 1/2007 | Belcea | |
| 7,536,416 B2 | 5/2009 | Abe | |
| 7,565,155 B2 | 7/2009 | Sheha et al. | |
| 7,640,098 B2 | 12/2009 | Stenbock et al. | |

(Continued)

OTHER PUBLICATIONS

Notice of Allowance (Mail Date Sep. 22, 2014) for U.S. Appl. No. 12/339,183, filed Dec. 19, 2008; Confirmation No. 6750.

(Continued)

*Primary Examiner* — Nicholas Kiswanto
(74) *Attorney, Agent, or Firm* — Schmeiser, Olsen & Watts; John Pivnichny

(57) ABSTRACT

An approach for generating optimal itineraries is presented. As a response to a first message sent to a remote computer system by a global positioning device transported by a vehicle on a trip, the device receives a second message indicating optimal itineraries of the trip. The device receives a selection of an optimal itinerary indicating a path, a hop, an updated service provider to provide a service to a mobile device transported by the vehicle, and an updated network for providing the service. The device detects the vehicle at a position indicated by the hop, and in response, generates a third message indicating the updated service provider and the updated network. The global positioning device sends the third message to the mobile device and as a result, the mobile device makes a connectivity change to the updated service provider and/or to the updated network.

12 Claims, 13 Drawing Sheets

(56) References Cited

U.S. PATENT DOCUMENTS

| | | |
|---|---|---|
| 7,890,258 B2 * | 2/2011 | Endo et al. .................... 701/423 |
| 7,925,436 B2 | 4/2011 | Blackwood |
| 7,941,108 B2 | 5/2011 | Shaffer et al. |
| 8,352,175 B2 | 1/2013 | Bauchot et al. |
| 8,948,738 B2 | 2/2015 | Bauchot et al. |
| 2001/0051523 A1 | 12/2001 | Bhatoolaul et al. |
| 2002/0029224 A1 | 3/2002 | Carlsson |
| 2003/0069029 A1 | 4/2003 | Dowling et al. |
| 2004/0157610 A1 | 8/2004 | Black et al. |
| 2005/0037756 A1 | 2/2005 | Yaguchi et al. |
| 2005/0102101 A1 | 5/2005 | Beesley et al. |
| 2007/0093247 A1 | 4/2007 | Yaqub |
| 2007/0298715 A1 | 12/2007 | Bight et al. |
| 2008/0125106 A1 | 5/2008 | Lee et al. |
| 2008/0177461 A1 | 7/2008 | Blackwood |
| 2010/0151840 A1 | 6/2010 | Bauchot et al. |
| 2010/0153001 A1 | 6/2010 | Bauchot et al. |
| 2013/0124086 A1 | 5/2013 | Bauchot et al. |

OTHER PUBLICATIONS

Office Action (Mail Date May 13, 2014) for U.S. Appl. No. 12/339,183, filed Dec. 19, 2008; Confirmation No. 6750.
Amendment filed Aug. 19, 2014 in response to Office Action (Mail Date May 13, 2014) for U.S. Appl. No. 12/339,183, filed Dec. 19, 2008; Confirmation No. 6750.
Office Action (Mail Date Oct. 3, 2011) for U.S. Appl. No. 12/339,156, filed Dec. 19, 2008; Confirmation No. 6693.
Amendment filed Aug. 1, 2011 in response to Office Action (Mail Date May 11, 2011) for U.S. Appl. No. 12/339,183, filed Dec. 19, 2008; Confirmation No. 6750.
Notice of Allowance (Mail Date Aug. 30, 2012) for U.S. Appl. No. 12/339,156, filed Dec. 19, 2008; Confirmation No. 6693.
Office Action (Mail Date May 11, 2011) for U.S. Appl. No. 12/339,183, filed Dec. 19, 2008; Confirmation No. 6750.
Final Office Action (Mail Date Oct. 25, 2011) for U.S. Appl. No. 12/339,183, filed Dec. 19, 2008; Confirmation No. 6750.
Request for Continued Examination and Preliminary Amendment filed Dec. 27, 2011 in response to Final Office Action (Mail Date Oct. 25, 2011) for U.S. Appl. No. 12/339,183, filed Dec. 19, 2008; Confirmation No. 6750.
Office Action (Mail Date Oct. 31, 2014) for U.S. Appl. No. 13/732,457, filed Jan. 2, 2013; Confirmation No. 3520.
Amendment filed Jan. 26, 2015 in response to Office Action (Mail Date Oct. 31, 2014) for U.S. Appl. No. 13/732,457, filed Jan. 2, 2013; Confirmation No. 3520.

* cited by examiner

GENERATING OPTIMAL ITINERARIES BASED ON NETWORK CONNECTIVITY

This application is a divisional application claiming priority to Ser. No. 12/339,156, filed Dec. 19, 2008, now U.S. Pat. No. 8,352,175 issued Jan. 8, 2013.

RELATED APPLICATIONS

The present application is related to a application entitled "Generating Alerts Based on Predicted Wireless Connection Losses", filed on Dec. 19, 2008, assigned to the assignee of the present application, and incorporated herein by reference in its entirety.

FIELD OF THE INVENTION

The present invention relates to a data processing method and system for generating optimal itineraries and more particularly to a technique for generating a list of itineraries that optimize network connectivity for services provided to one or more mobile devices.

BACKGROUND OF THE INVENTION

A conventional global positioning system (GPS) provides a best route for a traveler based on the route having the shortest distance or the shortest travel time. The conventional GPS-determined best route may also be further constrained by applying one or more geographic-based conditions that avoid highways, exclude selected street(s), and/or include selected geographic point(s). Determining best routes with conditions that are limited to geographic aspects provides a traveler with inadequate itinerary choices that fail to address significant needs of the traveler. Thus, there exists a need to overcome at least one of the preceding deficiencies and limitations of the related art.

SUMMARY OF THE INVENTION

In first embodiments, the present invention provides a computer-implemented method of generating optimal itineraries. The method comprises:

a computer system receiving a first message from a global positioning device that determines a geographic position of a vehicle on a trip, wherein the computer system is remote from the vehicle, and wherein the first message indicates the geographic position of the vehicle, a destination of the trip, one or more services requested for one or more mobile devices being transported by the vehicle, one or more preferred service providers of a plurality of service providers that provide the one or more services, and one or more preferred networks of a plurality of networks via which the one or more preferred service providers provide the one or more services to the one or more mobile devices;

the computer system generating a plurality of optimal itineraries for the trip, wherein the generating the plurality of optimal itineraries includes generating a set of optimal parameters for an optimal itinerary of the plurality of optimal itineraries, wherein the set of optimal parameters includes a plurality of paths in the optimal itinerary for which a plurality of measures of a network connectivity to the one or more preferred service providers satisfies one or more predefined criteria, wherein the set of optimal parameters further includes a hop indicating a position on a path of the plurality of paths, and wherein the hop is associated with a connectivity change; and the computer system sending a second message as a response to the first message, wherein the second message indicates the plurality of optimal itineraries, wherein a result of the sending the second message and the vehicle reaching the position indicated by the hop is a mobile device of the one or more mobile devices making the connectivity change, wherein the connectivity change is selected from a group consisting of a first change from a first preferred service provider providing a service of the one or more services to a mobile device of the one or more mobile devices to a second preferred service provider providing the service to the mobile device, a second change from a first preferred network via which the service is provided to the mobile device to a second preferred network of the one or more preferred networks via which the service is provided to the mobile device, and a combination thereof, wherein the first preferred service provider and the second preferred service provider are included in the one or more preferred service providers, and wherein the first preferred network and the second preferred network are included in the one or more preferred networks.

In second embodiments, the present invention provides a computer-implemented method of generating optimal itineraries. The method comprises:

a global positioning device receiving a destination of the trip, one or more services requested for one or more mobile devices being transported by the vehicle, one or more preferred service providers of a plurality of service providers that provide the one or more services, and one or more preferred networks of a plurality of networks via which the one or more preferred service providers provide the one or more services to the one or more mobile devices;

the global positioning device determining a geographic position of the vehicle;

subsequent to the receiving the destination and determining the position, the global positioning device sending a first message to a computer system that is remote from the vehicle, wherein the first message indicates the geographic position of the vehicle, the destination of the trip, the one or more services, the one or more preferred service providers, and the one or more preferred networks;

the global positioning device receiving a second message as a response to the first message, wherein the second message indicates a plurality of optimal itineraries generated by the computer system;

the global positioning device extracting the plurality of optimal itineraries from the second message;

subsequent to the extracting the plurality of optimal itineraries, the global positioning device generating and displaying a plurality of choices identifying the plurality of optimal itineraries on a display device;

subsequent to the displaying the plurality of choices, the global positioning device receiving a selection of a choice of the plurality of choices, wherein the selection identifies an optimal itinerary of the plurality of optimal itineraries, wherein the optimal itinerary includes a set of optimal parameters that indicate a path, a hop, an updated preferred service provider of the one or more preferred service providers, and an updated preferred network of the one or more preferred networks;

in response to the receiving the selection, the global positioning device storing the optimal itinerary in a computer memory;

the global positioning device detecting that the vehicle is located at a position indicated by the hop;

in response to the detecting that the vehicle is located at the position indicated by the hop, the global positioning device generating a third message indicating the updated preferred service provider and the updated preferred network;

the global positioning device sending the third message to a mobile device of the one or more mobile devices, wherein a result of the sending the third message is the mobile device making a connectivity change, wherein the connectivity change is selected from a group consisting of a first change from an initial preferred service provider providing a service of the one or more services to the mobile device to the updated preferred service provider providing the service to the mobile device, a second change from an initial preferred network via which the service is provided to the mobile device to the updated preferred network via which the service is provided to the mobile device, and a combination thereof, wherein the initial preferred service provider is included in the one or more preferred service providers, and wherein the initial preferred network is included in the one or more preferred networks.

A system, computer program product, and process for supporting computing infrastructure corresponding to the above-summarized methods are also described and claimed herein.

One or more embodiments of the present invention provide a technique for generating selectable itineraries for a trip based on the availability and reception of wireless services desired during the trip, where a desired wireless service may be, for example, digital television, digital radio, video on demand, or cellular telephone. An embodiment of the present invention further provides a technique for selecting an itinerary from the aforementioned possible itineraries, with paths in the selected itinerary presented in a vehicle to facilitate reaching a destination.

DETAILED DESCRIPTION OF THE INVENTION

Overview

One or more embodiments of the present invention include a technique for automatically determining optimal itineraries for a vehicle taking a trip. The optimal itineraries are specified by sets of parameters determined in accordance with corresponding predefined sets of criteria. Each predefined set of criteria may be based on a threshold level of quality of reception of a signal from a service provider, where the signal provides a service via a network to a mobile device being transported by the vehicle. One or more of the predefined sets of criteria may be further based on one or more other constraints, such as the cost of receiving a service and a time window during which the service is required to be available to a mobile device in the vehicle. In one embodiment, a hardware device in the vehicle presents choices that indicate the optimal itineraries and receives a selection of one of the choices, where the selection indicates a set of parameters that specifies one of the optimal itineraries. In one embodiment, the receipt of the aforementioned selection results in the hardware device or another device communicating paths in the indicated set of parameters and automatically and proactively making one or more connectivity changes for a mobile device in accordance with the indicated set of parameters. In one embodiment, the communication of the paths is received by a traveler who may use the paths to maneuver the vehicle and/or use one or more other vehicles to complete the trip while the proactive connectivity change(s) maintain an acceptable reception of signals providing a required service for the mobile device during the trip.

Optimal Itinerary Generation System

Figure 1:
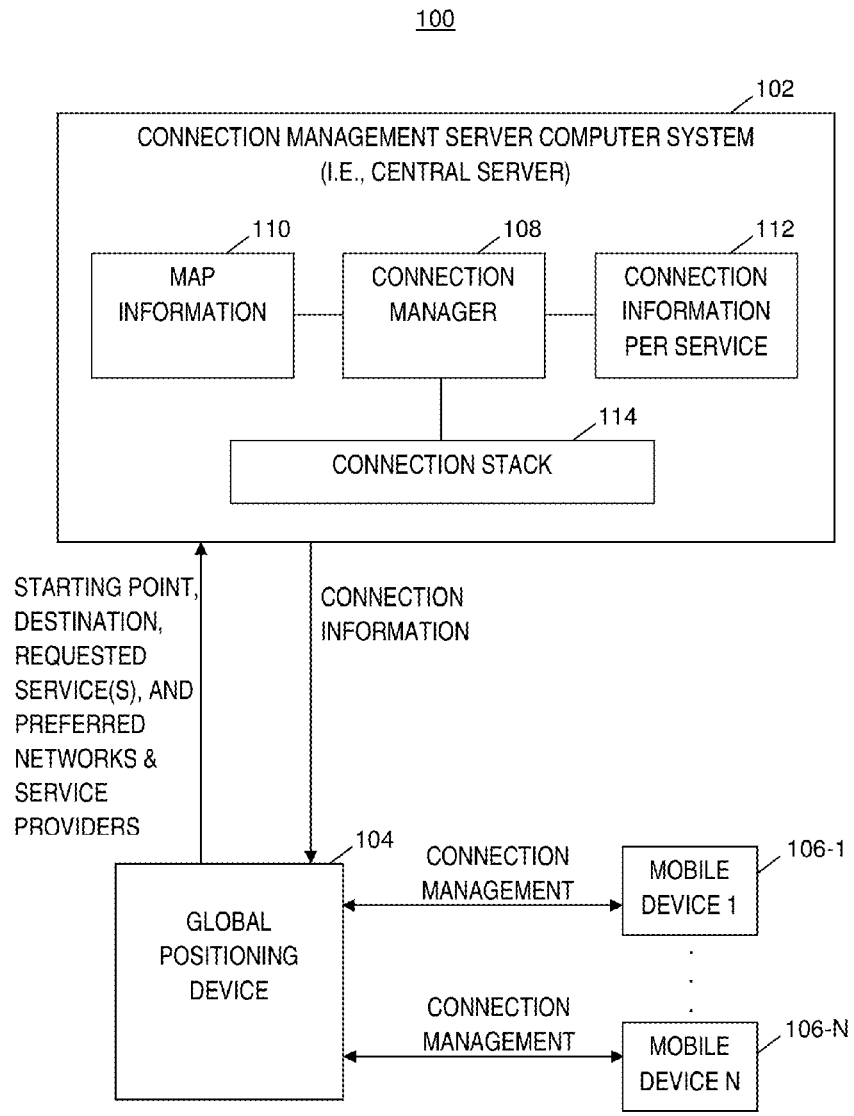
FIG. 1 is a block diagram of a system for generating itineraries that optimize network connections for services, in accordance with embodiments of the present invention.

FIG. 1 is a block diagram of a system for generating itineraries that optimize network connections for services, in accordance with embodiments of the present invention. System 100 includes a connection management server computer system 102 (a.k.a. central server), a global positioning device 104 (e.g., GPS), and one or more mobile devices 106-1 . . . 106-N. Global positioning device 104 is integrated in and/or transported by a vehicle. For example, global positioning device 104 may be mounted in a vehicle, placed in the vehicle without being mounted in the vehicle, or carried by a traveler who is being transported by the vehicle.

One or more mobile devices 106-1 . . . 106-N are integrated in (e.g., mounted in) and/or transported by the vehicle that includes or transports the global positioning device 104. Examples of mobile devices 106-1 . . . 106-N include a mobile television mounted in a vehicle and a mobile phone placed in or carried in the vehicle by a traveler.

Global positioning device 104 communicates with central server 102 via messages that employ a first new communications protocol referred to herein as a connection list (CLIST) protocol, where the messages are transmitted between global positioning device 104 and central server 102 via a means of wireless telecommunication (not shown) (e.g., wireless telecommunications network). The one or more mobile devices 106-1 . . . 106-N communicate with global positioning device 104 via messages that employ a second new communications protocol referred to herein as a connection management (CM) protocol, where the messages are transmitted between global positioning device 104 and the one or more mobile devices 106-1 . . . 106-N via a computer network (not shown).

Central server 102 is a computer system that includes a connection manager 108, map information 110, connection information per service 112 and a connection stack 114. Connection manager 108 is a software-based component that generates optimal itineraries that optimize network connections for services specified in a CLIST message. Map information 110 is a data store that includes signal coverage information that is received from multiple service providers (a.k.a. operators) using one or more networks over specified geographic areas. Connection information per service 112 is a data store that includes network connection-related information for multiple services, where the information is required to optimize network connections for one or more services selected from the multiple services. Map information 110 and connection information per service 112 are included in one or more computer data storage units (not shown) coupled to central server 102.

Connection stack 114 (a.k.a. communications stack, protocol processing stack, protocol stack, or network stack) is a software-based component that defines, uses, manages, and/or processes communications protocols (e.g., Transmission Control Protocol/Internet Protocol (TCP/IP) or the CLIST protocol). In one embodiment, connection stack 114 is a particular software implementation of a computer networking protocol suite (e.g., TCP/IP Internet Protocol Suite). As used herein, a computer networking protocol suite means a definition of communications protocols. As used herein, a communications protocol is defined as a set of rules for data representation, signaling, authentication and error detection required to send information over a communications channel.

Although not shown in FIG. 1, central server 102 stores the following data in a memory (not shown) or a computer data storage unit (not shown) coupled to central server 102: information included in a CLIST message, which is described in more detail below relative to the discussion of FIG. 2, and sets of parameters that specify itineraries that are optimal according to at least one set of predefined criteria described below relative to the discussion of FIG. 3A.

In one embodiment, global positioning device 104 includes one or more of the following components (not shown): a GPS, positioning controller software, device manager software, and a connection stack. The positioning controller software automatically determines when and what change is required in a mobile device's connection to a network and/or service provider based on a selected itinerary and a position of the vehicle (e.g., a current position as determined by the GPS or an anticipated position of the vehicle at a particular time). The device manager software manages the one or more mobile devices 106-1 . . . 106-N. For example, in response to receiving information from the positioning controller regarding the need to change a connection, the device manager software directs a mobile device to change a connection to a network and/or a service provider with a message using the CM protocol. The connection stack in device 104 is software that uses, manages, and/or processes communications protocols (e.g., CLIST protocol and CM protocol) to manage communications between device 104 and central server 102 and between device 104 and one or more mobile devices 106-1 . . . 106-N.

In one alternate embodiment, one or more components shown in device 104 are included in mobile devices 106-1 . . . 106-N instead of in the global positioning device. For example, in an alternate embodiment, the function of the GPS may be provided by a component embedded in mobile devices 106-1 . . . 106-N.

In another alternate embodiment, the geo-localization function provided by the GPS component may be provided by a geo-localization component included in device 104 or in another device, where the geo-localization component uses a triangulation technique (e.g., triangulation of Global System for Mobile communications (GSM) base stations) to determine the position of the vehicle.

In one embodiment, global positioning device 104 sends a message in the CLIST protocol to central server 102, where the message includes a starting point of a trip, a destination of the trip, one or more requested services to be provided to mobile device(s) during the trip, and one or more preferred network receivers to be used by the mobile device(s) to receive the requested service(s). Central server 102 sends a CLIST response to global positioning device 104, where the response includes connection information. In one embodiment, the connection information includes sets of parameters of itineraries where each set of parameters specifies a plurality of paths (i.e., routes) to be taken by a vehicle on the trip and a sequence of hops. Each hop is a geographic position at which a connection that provides a service to a mobile device is to be changed in response to the vehicle reaching the indicated geographic position. The change in the connection associated with a hop is a change in the service provider providing the service to the mobile device and/or a change in the network being used by a service provider to provide the service to the mobile device. For example, the change in the service provider is a change from a first service provider preferred by a user to a second service provider preferred by the user, and the change in the network is a change from a first network preferred by the user to a second network preferred by the user.

In one embodiment, global positioning device 104 sends a message in the CM protocol to direct a mobile device (e.g., mobile device 106-1) to switch from a first service provider to a second service provider, a first network to a second network, or a combination thereof, as specified in a user-selected itinerary and based on the vehicle reaching a position indicated in the itinerary and detected by device 104.

In one embodiment, global positioning device 104 is a computer system and a memory is coupled to device 104. A computer data storage unit may also be coupled to device 104. The memory or computer data storage unit coupled to device 104 stores the following data: information that is to be included in a CLIST message discussed below relative to FIG. 2 and a selected itinerary and a set of parameters that specifies the selected itinerary (see the discussions below relative to FIG. 3A and FIG. 4).

As used herein, a vehicle is defined as a mode of conveyance or transport in or by which someone travels. For example, a vehicle may be a motor-driven conveyance (e.g., automobile, bus or truck), a rail transport conveyance (e.g., train, subway car, cable car), a watercraft (e.g., boat, ship, or ferry), an aircraft (e.g., airplane or helicopter), an animal-powered mode of transportation (e.g., carriage or sled), or a human-powered mode of transportation (e.g., a bicycle or walking). As used herein, a mobile device is defined as a computing device used for mobile audio, visual, data and/or voice communication via a mobile telecommunications network of base stations. For example, a mobile device may be a mobile phone (i.e., wireless phone, cell phone or cellular phone), a mobile television, a laptop computer, a digital radio, or digital audio player (e.g., MP3 player). As used herein, an itinerary is defined as a proposed route of a trip and an optimal itinerary is defined as an itinerary associated with optimal parameters, where the optimal parameters satisfy one or more predefined criteria. As used herein, parameters and optimal parameters for an itinerary are defined as values that indicate paths included in an itinerary, service provider(s) that provide one or more services to one or more mobile devices being transported by a vehicle on a trip, network(s) via which the service provider(s) provide the service(s) to the mobile device (s), and hop(s) that specify one or more geographic positions at which one or more connectivity changes occur. As used herein, a connectivity change (a.k.a. change in a connection) is defined as a change from a first service provider providing a service to a mobile device to a second service provider providing the service to the mobile device and/or a change from a first network via which the service is provided to the mobile device to a second network via which the service is provided to the mobile device.

Optimal Itinerary Generation Processes

Figure 2:
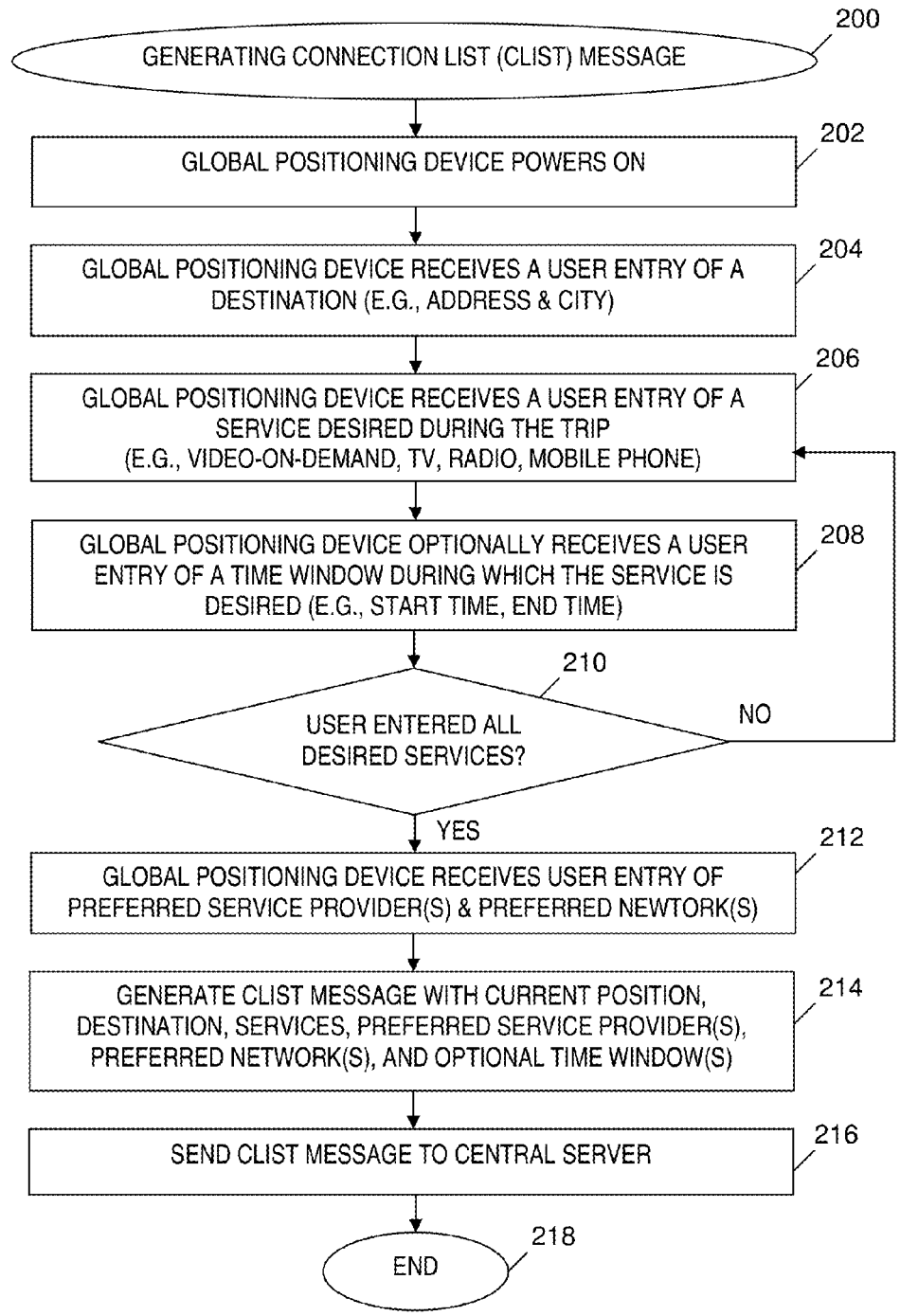
FIG. 2 is a flowchart of a process for generating a connection list message in the system of FIG. 1, in accordance with embodiments of the present invention.

FIG. 2 is a flowchart of a process for generating a connection list (CLIST) message in the system of FIG. 1, in accordance with embodiments of the present invention. The process for generating a CLIST message starts at step 200. In step 202, a user powers on the global positioning device 104 (see FIG. 1) in a vehicle and the global positioning device is initialized. In step 204, global positioning device 104 (see FIG. 1) receives a user entry of a position (a.k.a. destination position; e.g., coordinates or an address and a city) of a destination of trip that a traveler plans to take by means of the vehicle. The global positioning device 104 (see FIG. 1) optionally receives a date of the trip in step 204.

In step 206, global positioning device 104 (see FIG. 1) receives a user entry of a service (e.g., multimedia service) that the traveler desires for a mobile device being transported by the vehicle during the trip. In one embodiment, the service is an audio, visual, or multimedia telecommunications service (e.g., video-on-demand, digital television, digital radio, or mobile phone). As used herein, a service that a traveler "desires" is defined as a service that the traveler wants and/or requires for a mobile device being transported by a vehicle during a trip.

In step 208, global positioning device 104 (see FIG. 1) optionally receives a user entry of a time window during which the newly entered service is desired by the traveler (i.e., a time window during which the service entered in the most recent performance of step 206 is to be provided to a mobile device in the vehicle). For example, in step 208, the user enters a start time and an end time that indicate, respectively, when the traveler wants a specific multimedia service to start being provided to a mobile device and when the traveler wants the multimedia service to stop being provided to the mobile device.

If the global positioning device 104 (see FIG. 1) determines in step 210 that the user entered all the services desired by the traveler during the trip, then the process of generating a CLIST message continues with step 212; otherwise, the process repeats (i.e., loops) starting at step 206. For example, the determination made in step 210 may include global positioning device 104 (see FIG. 1) receiving a selection of a graphical user interface element by the user (e.g., an activation of an on-screen button) that indicates that the user has completed entry of desired services and that no additional services are desired by the traveler.

If the No branch of step 210 is taken, the repeating of step 206 includes the device 104 (see FIG. 1) receiving a user entry of another service desired by the traveler during the trip. Furthermore, the repeating of step 208 includes the device 104 (see FIG. 1) receiving a user entry of another time window during which the other service (i.e., the service entered in the most recent performance of step 206) is desired.

After the user finishes entering all the desired services (i.e., the Yes branch of step 210 is taken), global positioning device 104 (see FIG. 1) receives a user entry of one or more preferred service providers and one or more preferred networks in step 212. That is, the user enters the user's preference(s) for service provider(s) (i.e., preferred service provider(s)) to provide the service(s) entered in step 206, and the user's preference(s) for network(s) and/or other methods by which the mobile device(s) 106-1 . . . 106-N (see FIG. 1) connect to the preferred service provider(s). For example, the user enters WIFI, WIMAX, Digital Video Broadcasting Handheld (DVB-H), Terrestrial Digital Multimedia Broadcasting (T-DMB) or a cellular telephony provider such as AT&T® in step 212. In one embodiment, the device 104 (see FIG. 1) orders the list entered in step 212 to comply with cost constraints.

Although not shown as a separate step in FIG. 2, global positioning device 104 (see FIG. 1) receives a current position of the vehicle prior to step 214. In one embodiment, global positioning device 104 (see FIG. 1) uses a GPS to detect the current position of the vehicle. In another embodiment, a geo-localization system that employs a triangulation method (e.g., triangulation of GSM base stations) detects the current position of the vehicle. The geo-localization system employing triangulation may be included in device 104 (see FIG. 1) or may be separate from device 104 (see FIG. 1) and send the current position to device 104 (see FIG. 1).

In step 214, global positioning device 104 (see FIG. 1) generates a CLIST message that includes the current position of the vehicle (e.g., N43°42', E7°16', as determined by a GPS), the destination received in step 204, the one or more services received in step 206, the one or more preferred service providers received in step 212, and the one or more preferred networks received in step 212. The CLIST message also includes any time window received in step 208. The time windows may be included in the CLIST message in the form of a list of {service, time window} couples. Each {service, time window} couple includes a service and a time window received in one iteration of the loop in FIG. 2 that includes steps 206 and 208.

In step 216, the global positioning device 104 (see FIG. 1) sends the CLIST message generated in step 214 to central server 102 (see FIG. 1). The central server 102 (see FIG. 1) receives the CLIST message sent in step 216. The central server uses the information in the CLIST message to generate one or more possible itineraries based on the user entries in steps 204, 206, 208 and 212. The details of the central server 102 (see FIG. 1) generating the possible itineraries are presented below relative to FIGS. 3A-3C. The process of generating a CLIST message ends at step 218.

Figure 3A:
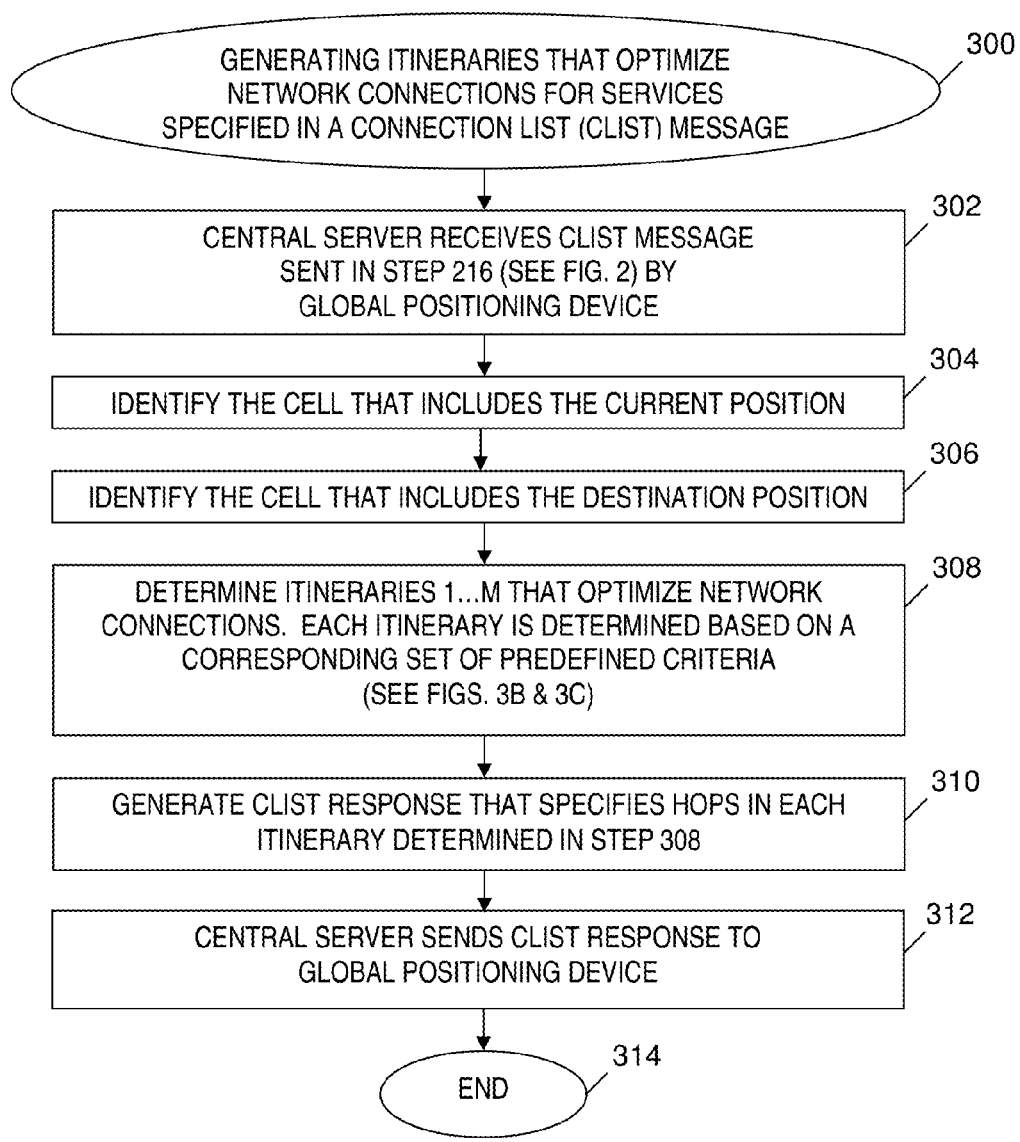
FIG. 3A is a flowchart of a process for generating itineraries that optimize network connections for services, where the process is implemented by the system of FIG. 1, in accordance with embodiments of the present invention.

FIG. 3A is a flowchart of a process for generating itineraries that optimize network connections for services, where the process is implemented by the system of FIG. 1, in accordance with embodiments of the present invention. The process of generating itineraries that optimize network connections for services begins at step 300. In step 302, central server 102 (see FIG. 1) receives the CLIST message sent in step 216

(see FIG. 2) by global positioning device 104 (see FIG. 1). That is, in step 302, central server 102 (see FIG. 1) receives the CLIST message and extracts the following information included in the CLIST message: the current position of the vehicle (e.g., as detected by a GPS included in device 104 of FIG. 1), the destination received in step 204 (see FIG. 2), the one or more services received in step 206 (see FIG. 2), the one or more preferred service providers received in step 212 (see FIG. 2), and the one or more preferred networks received in step 212 (see FIG. 2). The central server also extracts any time window that may be included in the CLIST message (see step 208 of FIG. 2).

In step 304, central server 102 (see FIG. 1) identifies on a map retrieved from map information 110 (see FIG. 1) a first cell that includes the current position received in step 302. In step 306, central server 102 (see FIG. 1) identifies on the retrieved map a second cell that includes the destination position received in step 302.

In step 308, central server 102 (see FIG. 1) determines and generates one or more optimal itineraries 1 . . . M and one or more associated sets of optimal parameters that optimize network connections based on one or more sets of predefined criteria (i.e., provide optimal connections between the one or more mobile devices 106-1 . . . 106-N of FIG. 1 and the preferred service provider(s) via the preferred network(s)). In one embodiment, optimal parameters in a set of optimal parameters associated with an optimal itinerary include indications of: a plurality of paths, one or more hops, one or more service providers, and one or more networks. The plurality of paths specifies a sequence of routes over which the vehicle may travel to reach the destination position. The one or more hops are one or more geographic positions at which one or more connectivity changes are to occur. Each connectivity change is specified as a change to a service provider and a network indicated in the set of optimal parameters.

In one embodiment, in step 308, central server 102 (see FIG. 1) generates a plurality of optimal itineraries and associated sets of optimal parameters that optimize network connections based on a plurality of sets of predefined criteria, where each set of predefined criteria uniquely corresponds to one of the optimal itineraries and to one of the sets of optimal parameters.

Generating a set of optimal parameters in step 308 includes the central server 102 (see FIG. 1) performing a cell-by-cell comparison of measures of network connectivity (e.g., quality of a signal) between the one or more preferred service providers (see step 212 of FIG. 2) and the one or more mobile devices being transported in the vehicle, where the measures of network connectivity are determined for a service provided via the one or more preferred networks, and where a result of comparing the measures of network connectivity satisfies one of the aforementioned sets of predefined criteria.

In one embodiment, at least one of the sets of predefined criteria indicates that the aforementioned comparing of measures of network connectivity determines a best quality of a signal (e.g., highest signal to noise ratio) in a particular cell. Furthermore, the best quality of the signal determines which combination of network and service provider provides the service to the one or more mobile devices in the vehicle along a path that is included in the particular cell. In another embodiment, the selection of a combination of network and service provider is based on both a best quality of signal determination and is further constrained by time window(s) (see step 208 of FIG. 2) and/or one or more cost requirements (e.g., the cost of receiving a service from a particular network and service provider on a particular path in a particular cell must not exceed a predetermined maximum cost, the total cost of receiving the one or more services throughout the trip must not exceed a predetermined maximum cost, and for similar qualities of signals between different combinations of networks and service providers in a particular path in a particular cell, the lowest cost of receiving the service determines which combination to select).

In one embodiment, the measures of network connectivity compared in step 308 are predetermined by the one or more preferred service providers for multiple cells in a geographic region (e.g., the measures of network connectivity are provided by a coverage map supplied by a service provider, where the map indicates various levels of signal quality). In another embodiment, the measures of network connectivity compared in step 308 are actual data dynamically determined during the itinerary optimization described herein and periodically received by central server 102 (see FIG. 1) or global positioning device 104 (see FIG. 1).

Generating the optimal itineraries in step 308 includes the central server 102 (see FIG. 1) selecting each path of the plurality of paths. The selection of each path may be based on a best quality of signal determination as described above, any time windows received in step 208 of FIG. 2, and/or one or more other constraints that may include, for example: the distance between the starting point and the destination along the paths must be the shortest distance or must not exceed a predetermined maximum distance, gas consumption must be the least possible amount or must not exceed a predetermined maximum amount, carbon dioxide emission must be the least possible amount or must not exceed a predetermined maximum amount, an amount of time to complete the trip must be the shortest possible amount of time or must not exceed a predetermined maximum amount of time, and the selected paths must include one or more predetermined geographic positions (e.g., a position of a particular restaurant, positions specifying a particular section of a highway, or a position of a tourist attraction). The plurality of the paths determined in step 308 also determines which cells are used in the aforementioned cell-by-cell comparison of measures of network connectivity.

In one embodiment, step 308 includes the central server 102 (see FIG. 1) retrieving and applying a predetermined rule to use a constraint as the basis for determining the plurality of paths. The rule being applied is retrieved from its storage in a computer storage unit coupled to the central server.

In one embodiment, step 308 includes a first sub-step and a second sub-step (not shown in FIG. 3A). In the first sub-step of step 308, central server 102 (see FIG. 1) determines a first optimal itinerary based on a best quality of signal in each cell and a shortest path to the destination. Details of the first sub-step are presented below relative to FIG. 3B. In the second sub-step of step 308, central server 102 (see FIG. 1) determines a second optimal itinerary based on a best quality of signal in each cell without a constraint of a shortest path to the destination. Details of the second sub-step are presented below relative to FIG. 3C. In another embodiment, step 308 includes the aforementioned first sub-step, but not the aforementioned second sub-step. In still another embodiment, step 308 includes the aforementioned second sub-step, but not the aforementioned first sub-step.

In step 310, central server 102 (see FIG. 1) generates a response (a.k.a. CLIST response) that uses the CLIST protocol and is a response to the CLIST message received in step 302. The CLIST response specifies one or more hops in each of the one or more itineraries 1 . . . M determined in step 308. As used herein, a hop is defined as a position in an itinerary where a change in service provider and/or a change in network is required to optimize a network connection. For example, step 310 generates a response that specifies itinerary-1 that has the form {road.1.1, pos.1.1, network.1.1, service_provider.1.1 . . . road.1.n, pos.1.n, network.1.n, service_provider.1.n] and itinerary-2 that has the form {road.2.1, pos.2.1, network.2.1, service_provider.2.1 . . . road.2.m, pos.2.m, network.2.m, service_provider.2.m], where itinerary-1 and itinerary-2 are the first optimal itinerary and second optimal itinerary determined in step 308. In the example of this paragraph, a j-th hop of an i-th itinerary determined in step 308 is specified by a group of data items in the form road.i.j, pos.i.j, network.i.j, service_provider.i.j. The road.i.j data item specifies a path (e.g., road) in the i-th itinerary and the pos.i.j data item specifies a position on the specified path at which a change in the service provider and/or a change in the network is required. The network.i.j and service_provider.i.j data items specify the network and service provider, respectively, that are to be used to supply the network connection for a mobile device in the vehicle (e.g., mobile device 106-1 of FIG. 1). At least one of the network.i.j and service_provider.i.j data items indicates a change from the network and/or service provider that is used in a portion of the itinerary that immediately precedes the j-th hop.

In step 312, central server 102 (see FIG. 1) sends the CLIST response generated in step 310 to global positioning device 104 (see FIG. 1). The process for generating itineraries that optimize network connections for services specified in a CLIST message ends at step 314.

In the method described above relative to FIG. 3A, the central server 102 (see FIG. 1) includes a data store and/or memory that stores the information included in the CLIST message in response to receiving the CLIST message in step 302 (i.e., the current position of the vehicle, the destination position of the trip, the one or more requested services, one or more preferred service providers, one or more service providers, one or more optional time windows, and one or more other optional constraints such as cost constraints), while no data store or memory coupled to the central server stores the sets of parameters that specify optimal itineraries in response to step 302. In one embodiment, performing steps 304, 306, 308 and 310 transforms a computer data storage unit that is coupled to central server 102 (see FIG. 1) from a storage unit that includes no data that specifies optimal itineraries to a storage unit that stores the sets of parameters that specify itineraries that are optimal according to at least one of the sets of predefined criteria described above relative to step 308. In another embodiment, performing steps 304, 306, 308 and 310 transforms a memory that is coupled to central server 102 (see FIG. 1) from a memory that includes no data that specifies optimal itineraries to a memory that stores the sets of parameters that specify itineraries that are optimal according to at least one of the sets of predefined criteria described above relative to step 308.

Figure 3B:
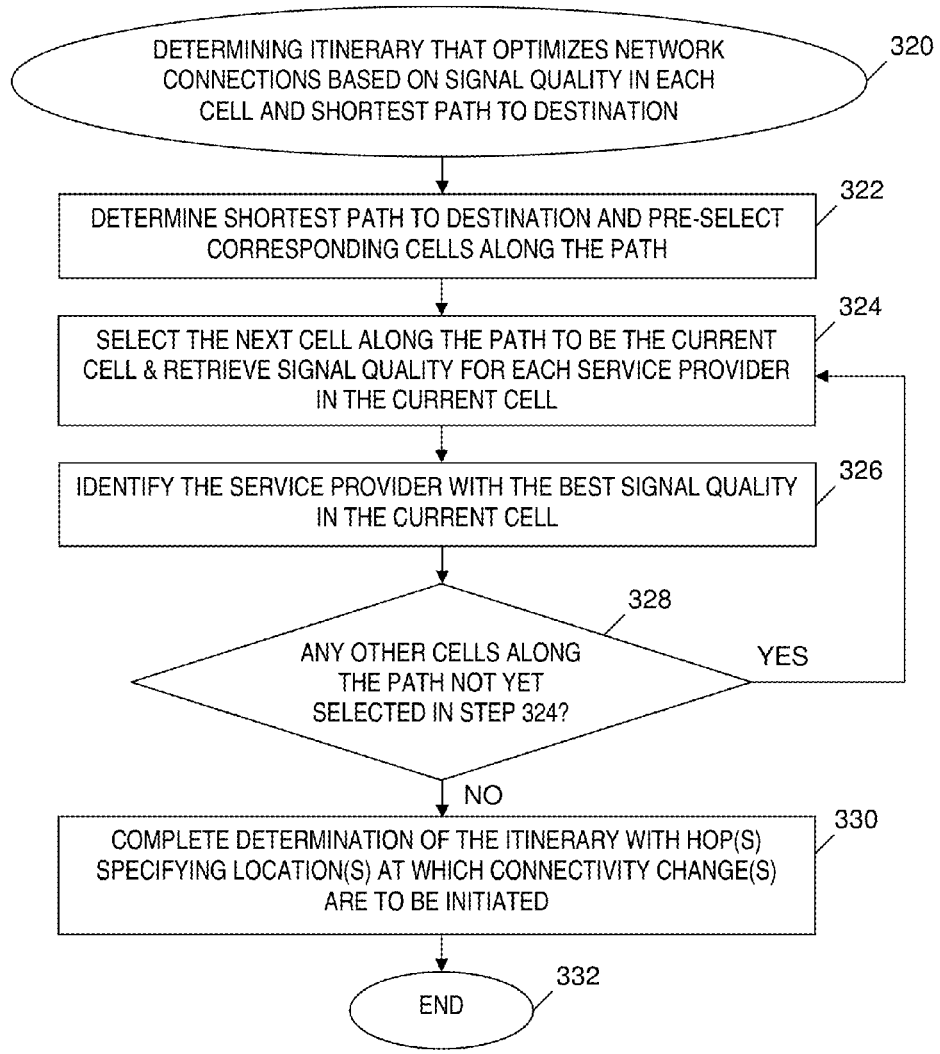
FIG. 3B is a flowchart of a process for determining an itinerary generated in the process of FIG. 3A, where the itinerary optimizes network connections based on signal quality and a shortest path, in accordance with embodiments of the present invention.

FIG. 3B is a flowchart of a process for determining an itinerary generated in the process of FIG. 3A, where the itinerary optimizes network connections based on signal quality and a shortest path, in accordance with embodiments of the present invention. The process for determining an itinerary that optimizes network connections based on signal quality in each cell and based on a shortest path to the destination begins at step 320. As used herein, signal quality is a quantified measure of perceived quality of multimedia. One example of signal quality is a mean opinion score (MOS), which is a numerical indication of the perceived quality of received media after compression and/or transmission. Signal quality may be measured by a human or by a software application. Examples of software applications that measure signal quality include Brix® Test Suites provided by EXFO Service Assurance located in Chelmsford, Mass., and Experience Manager provided by Psytechnics® Ltd. located in Ipswich, Suffolk, United Kingdom. In step 322, central server 102 (see FIG. 1) determines the shortest path to the destination that is included in the CLIST message received in step 302 (see FIG. 3A). Step 322 also includes the central server pre-selecting the corresponding cells along the shortest path.

In step 324, central server 102 (see FIG. 1) selects the next cell along the path determined in step 322 to be the current cell. In the initial loop that includes step 324, the "next" cell is the initial cell in the path determined in step 322. In a subsequent loop that includes step 324, the "next" cell is the cell that is next along the path determined in step 322 in relation to the cell that was selected in step 324 preformed in the previous iteration. Also in step 324, the central server retrieves the signal quality for each service provider in the current cell. In one embodiment, the central server 102 (see FIG. 1) retrieves signal quality information from the connection information per service 112 (see FIG. 1). In step 326, central server 102 (see FIG. 1) identifies the service provider that provides the best signal quality in the current cell. In another embodiment, step 326 includes the central server identifying the service provider that provides a quality of a signal that is greater than or equal to a predetermined threshold value.

In step 328, if central server 102 (see FIG. 1) determines that a cell along the path determined in step 322 has not yet been selected in step 324, then the process of FIG. 3B starts a subsequent loop starting at step 324; otherwise, the process of FIG. 3B continues with step 330.

In step 330, central server 102 (see FIG. 1) completes a determination of an optimal itinerary along the path determined in step 322, where the optimal itinerary is to be returned in a CLIST response (see step 312 of FIG. 3A) to global positioning device 104 (see FIG. 1). If step 326 is performed in one or more loops following the initial performance of step 326, then the optimal itinerary determined in step 330 includes one or more hops that specify the one or more service providers identified in step 326 in the aforementioned one or more loops. The process of FIG. 3B ends at step 332.

Figure 3C:
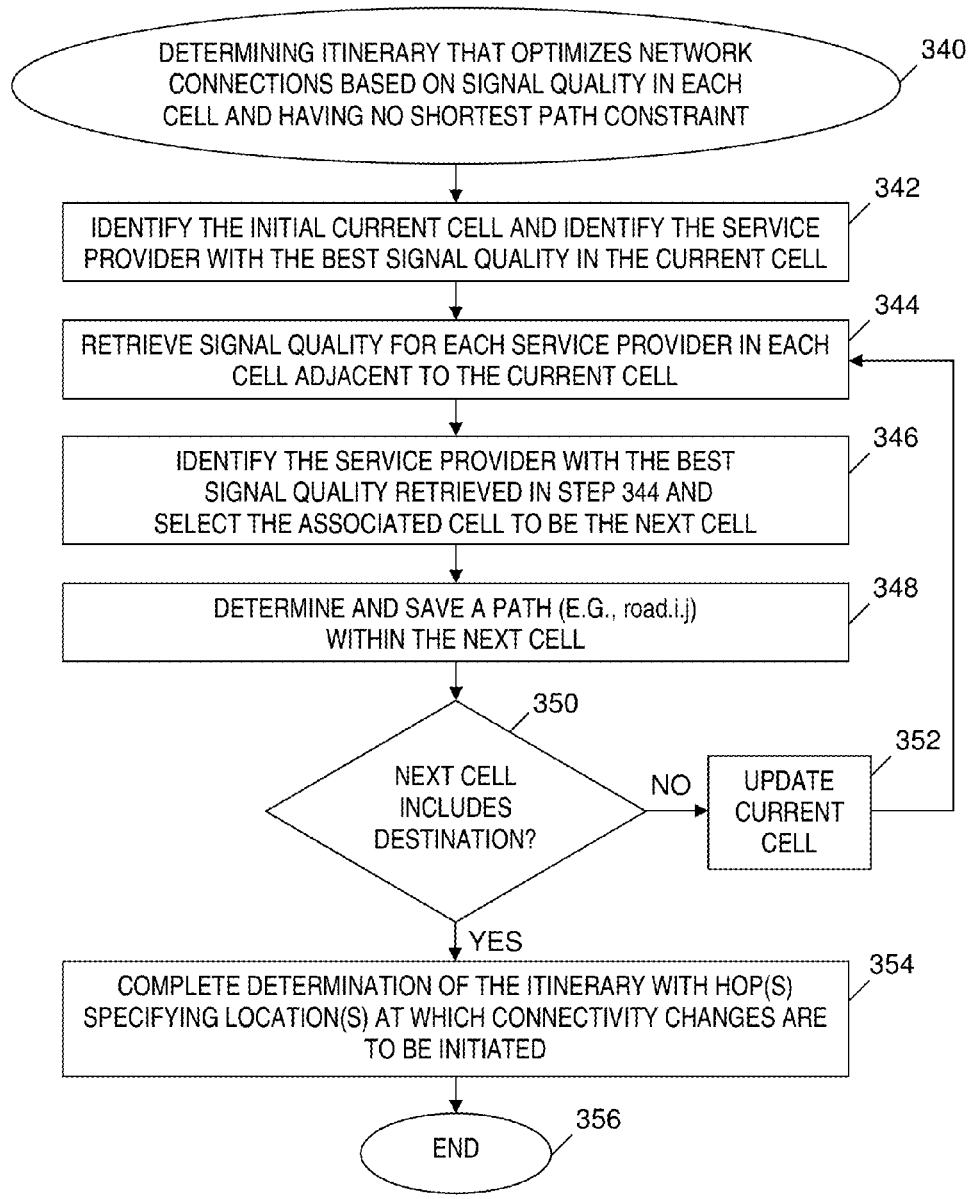
FIG. 3C is a flowchart of a process for determining an itinerary generated in the process of FIG. 3A, where the itinerary optimizes network connections based on signal quality without a shortest path constraint, in accordance with embodiments of the present invention.

FIG. 3C is a flowchart of a process for determining an itinerary generated in the process of FIG. 3A, where the itinerary optimizes network connections based on signal quality without a shortest path constraint, in accordance with embodiments of the present invention. The process for determining an itinerary that optimizes network connections based on signal quality without a shortest path constraint begins at step 340. In step 342, central server 102 (see FIG. 1) identifies the initial current cell and identifies the service provider that provides the best signal quality in the current cell. In one embodiment, the central server identifies the initial current cell on a coverage map retrieved from map information 110 (see FIG. 1) and determines the best signal quality in the current cell from the connection information per service 112 (see FIG. 1).

In step 344, central server 102 (see FIG. 1) retrieves indications of signal quality for each service provider in each cell adjacent to the current cell. In step 346, central server 102 (see FIG. 1) identifies the service provider that provides the best signal quality of the signal quality indications retrieved in step 344. Also in step 346, the central server selects the adjacent cell associated with the best signal quality to be the next cell.

In step 348, central server 102 (see FIG. 1) determines a route (e.g., road.i.j) within the next cell and saves the determined route in a computer data storage device. If central server 102 (see FIG. 1) determines in step 350 that the destination included in the CLIST message received in step 302 (see FIG. 3A) has not been reached by the vehicle, then the current cell is updated in step 352 to be the next cell selected in step 346. Following step 352, the process of FIG. 3C repeats starting at step 344.

If the central server 102 (see FIG. 1) determines in step 350 that the destination included in the CLIST message has been reached by the vehicle, then the process of FIG. 3C continues with step 354. In step 354, the central server 102 (see FIG. 1) completes a determination of an optimal itinerary that includes the route(s) determined in step 348, where the optimal itinerary is to be returned in a CLIST response (see step 312 of FIG. 3A) to global positioning device 104 (see FIG. 1). If step 354 is performed in one or more loops following the initial performance of step 350, then the optimal itinerary determined in step 354 includes one or more hops that specify the one or more service providers identified in step 346 in the aforementioned one or more loops. The process of FIG. 3C ends at step 356.

For example, the central server retrieves a first set of cells that are adjacent to a current cell, where a first service provider provides a service in the first set of cells with a first signal quality (see step 344). Furthermore, the central server retrieves a second set of cells that are adjacent to the current cell, where a second service provider provides the service in the second set of cells with a second signal quality (see step 344). The central server then identifies (see step 346) the service provider having the highest quality of reception in one of the adjacent cells retrieved in step 344 and the adjacent cell becomes the next cell. In step 348, the central server computes and saves the road.i.j route within the next cell. The next cell becomes the current cell and the exemplary steps presented above in this paragraph are repeated in a loop until the destination is reached by the vehicle. After the destination is reached in the example in this paragraph, the central server returns itinerary-2 in the form {road.2.1, pos.2.1, network.2.1, service_provider.2.1 . . . road.2.m, pos.2.m, network.2.m, service_provider.2.m] (see step 354).

Figure 4:
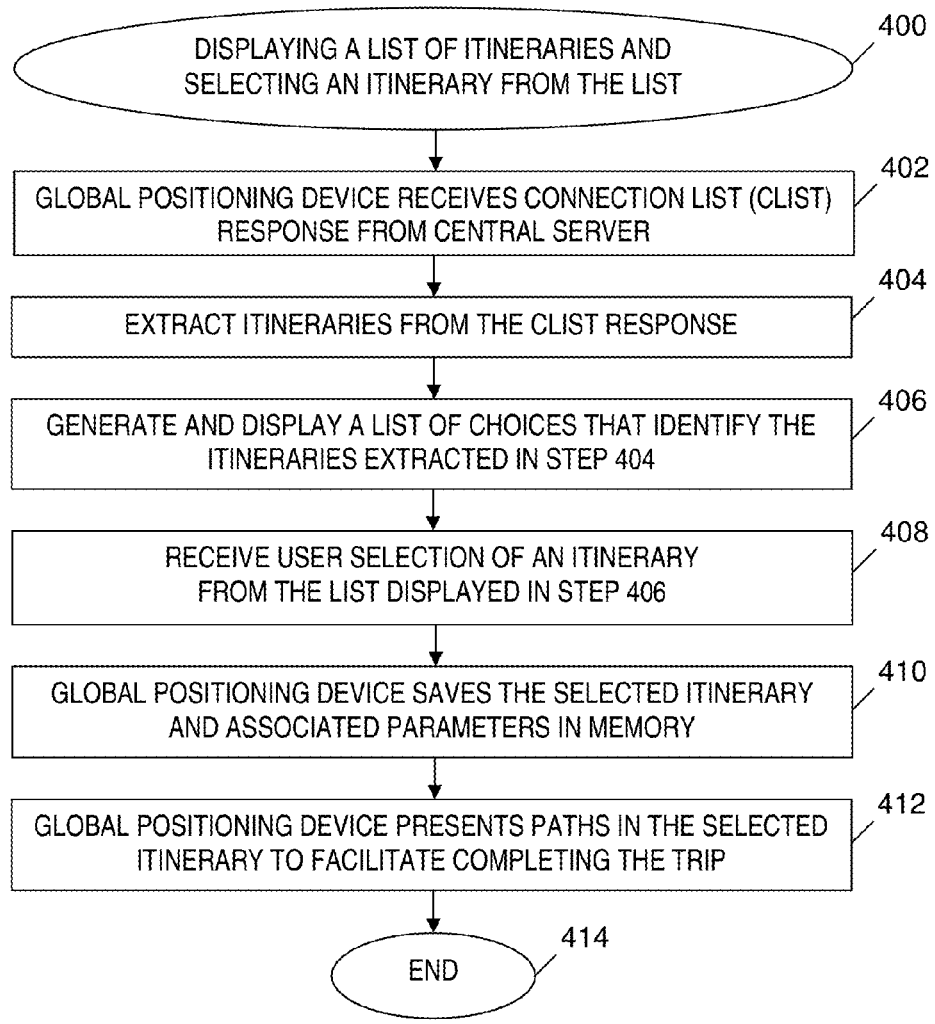
FIG. 4 is a flowchart of a process for displaying a list of itineraries generated in the process of FIG. 3A and for selecting an itinerary from the displayed list, in accordance with embodiments of the present invention.

FIG. 4 is a flowchart of a process for displaying a list of itineraries generated in the process of FIG. 3A and for selecting an itinerary from the displayed list, in accordance with embodiments of the present invention. The process of displaying a list of itineraries begins at step 400. In step 402, global positioning device 104 (see FIG. 1) receives the CLIST response sent by the central server 102 (see FIG. 1) in step 312 (see FIG. 3A).

In step 404, global positioning device 104 (see FIG. 1) extracts the one or more itineraries included in the CLIST response received in step 402. In step 406, global positioning device 104 (see FIG. 1) generates and displays a list of selection(s) that identify the one or more itineraries retrieved in step 404.

For example, the global positioning device displays the parameters of the first itinerary in the list retrieved in step 404, where the parameters indicate a series of n paths (i.e., routes) to the destination: the first next hop to the destination (i.e., road.1.1), the geographical position of the first next hop (i.e., pos.1.1), the service provider to be used for the first path (i.e., service_provider.1.1) and the network (e.g., WIFI, DVB-H, etc.) to be used for the first path (i.e., network.1.1); . . . ; the n-th next hop to the destination (i.e., road.1.n), the geographical position of the n-th next hop (i.e., pos.1.n), the service provider to be used for the n-th path (i.e., service_provider.1.n), and the network to be used for the n-th path (i.e., network.1.n).

Continuing the example from the previous paragraph, the global positioning device displays the parameters of the other itineraries in the list retrieved in step 404, ending with a display of the parameters of the m-th itinerary that indicate an m-th series of n paths (i.e., routes) to the destination: the first next hop to the destination (i.e., road.m.1), the geographical position of the first next hop (i.e., pos.m.1), the service provider to be used for the first path of the m-th series of n paths (i.e., service_provider.m.1) and the network to be used for the first path of the m-th series of n paths (i.e., network.m.1); . . . ; the n-th next hop to the destination (i.e., road.m.n), the geographical position of the n-th next hop (i.e., pos.m.n), the service provider to be used for the n-th path of the m-th series of n paths (i.e., service_provider.m.n), and the network to be used for the n-th path of the m-th series of n paths (i.e., network.m.n).

In step 408, the user selects an itinerary from the list displayed in step 406, and the device 104 (see FIG. 1) receives the user's selected itinerary (e.g., itinerary j). In step 410, the global positioning device 104 (see FIG. 1) saves the selected itinerary and the parameters of the selected itinerary in memory. In step 412, global positioning device 104 (see FIG. 1) presents (i.e., communicates) paths included in the selected itinerary to assist the traveler in reaching the destination and completing the trip (e.g., by facilitating the traveler's maneuvering of the vehicle along a sequence of routes specified by the selected itinerary). The process of displaying a list of itineraries ends at step 414.

For example, the user's selected itinerary is the j-th itinerary and the global positioning device saves the following parameters of the j-th itinerary in step 410: the first next hop to the destination (i.e., road.j.1), the geographical position of the first next hop (i.e., pos.j.1), the service provider to be used for the first path of the j-th series of n paths (i.e., service_provider.j.1), and the network to be used for the first path of the j-th series of n paths (i.e., network.j.1); . . . ; the n-th next hop to the destination (i.e., road.j.n), the geographical position of the n-th next hop (i.e., pos.j.n), the service provider to be used for the n-th path of the j-th series of n paths (i.e., service_provider.j.n), and the network to be used for the n-th path of the j-th series of n paths (i.e., network.j.n).

In a process performed by global positioning device 104 (see FIG. 1), which includes the processes of FIGS. 2 and 4, the global positioning device initially includes a data store and/or memory that stores the information that is to be included in the CLIST message sent in step 216 (see FIG. 2) (i.e., the current position of the vehicle, the destination position of the trip, the one or more requested services, one or more preferred service providers, one or more service providers, one or more optional time windows, and one or more other optional constraints such as cost constraints), while no data store or memory coupled to the global positioning device stores initially stores an itinerary selected in step 408 and the set of parameters that specifies the selected itinerary. In one embodiment, performing steps 402, 404, 406, 408 and 410 transforms a computer data storage unit that is coupled to global positioning device 104 (see FIG. 1) from a storage unit that includes no selected itinerary and no set of parameters that specifies a selected itinerary to a storage unit that stores a selected itinerary and a set of parameters that specifies the selected itinerary. In another embodiment, performing steps 402, 404, 406, 408 and 410 transforms a memory that is coupled to global positioning device 104 (see FIG. 1) from a memory that includes no selected itinerary and no set of parameters that specifies a selected itinerary to a data store that stores a selected itinerary and a set of parameters that specifies the selected itinerary.

Figure 5:
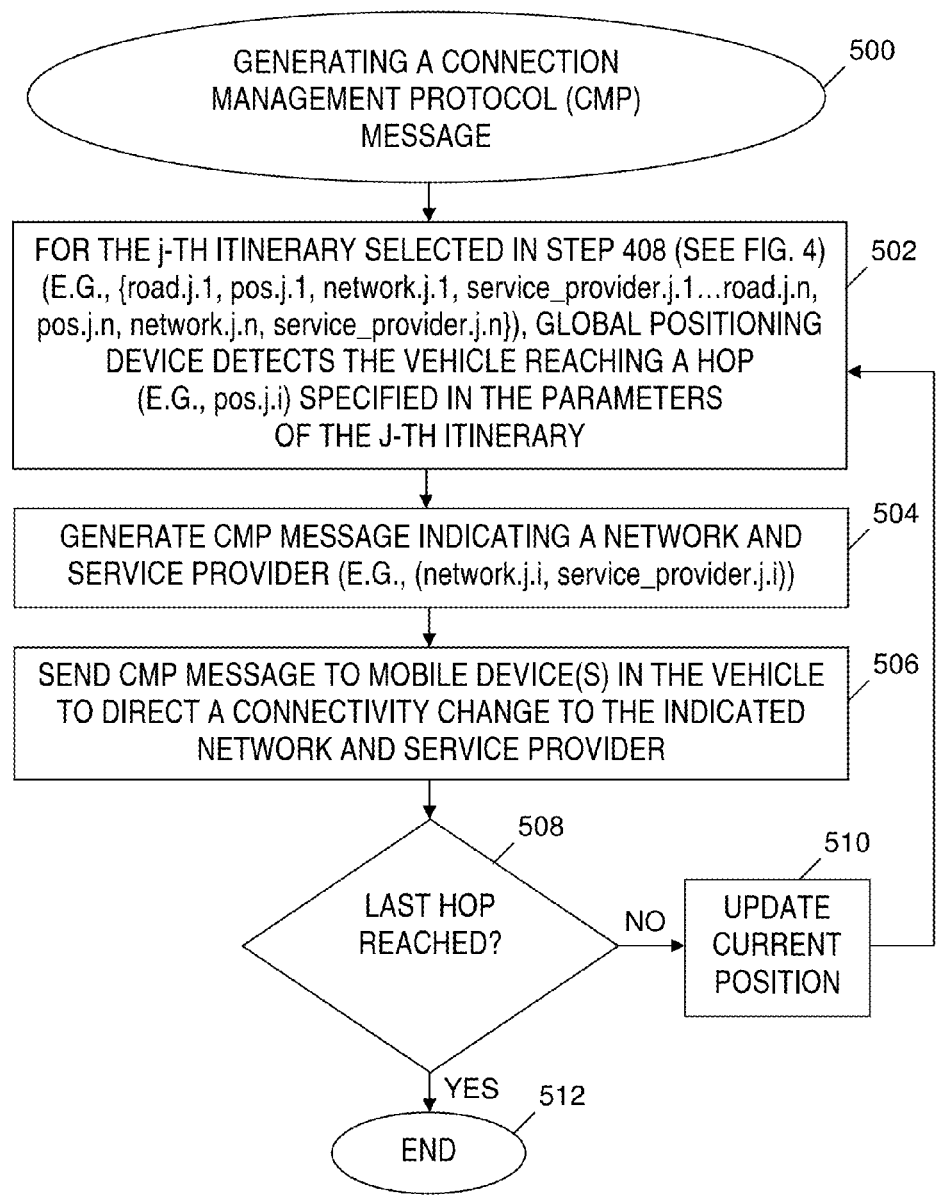
FIG. 5 is a flowchart of a process for generating a connection management protocol message in the system of FIG. 1, in accordance with embodiments of the present invention.

FIG. 5 is a flowchart of a process for generating a connection management protocol message in the system of FIG. 1, in accordance with embodiments of the present invention. The process for generating a CM protocol message starts at step 500. Step 502 applies to a j-th itinerary (e.g., {road.j.1, pos.j.1, network.j.1, service_provider.j.1 . . . road.j.n, pos.j.n, network.j.n, service_provider.j.n}), which was selected in step 408 (see FIG. 4). In step 502, the global positioning device 104 (see FIG. 1) monitors the position of the vehicle relative to each of the geographical positions (i.e., pos.j.1 . . . pos.j.n) in the parameters of the j-th itinerary. In step 502, global positioning device 104 (see FIG. 1) determines that the vehicle reaches an i-th current position that is included in the j-th itinerary (e.g., pos.j.i).

In step 504, the global positioning device 104 (see FIG. 1) generates a message that uses the CM protocol (a.k.a. a CMP message) in response to the vehicle reaching an i-th geographical position included in the parameters of the j-th itinerary. The CMP message generated in step 504 indicates an i-th network and an i-th service provider (e.g., (network.j.i, service_provider.j.i)) that the mobile device(s) (e.g., mobile device 106-1 of FIG. 1) are to switch to for a next path of the j-th itinerary, where the next path starts at the i-th geographical position.

In step 506, global positioning device 104 (see FIG. 1) sends the CMP message generated in step 504 to one or more mobile devices in the vehicle (e.g., mobile device 106-1 of FIG. 1) to direct the mobile device(s) to change to the network and service provider indicated by the CMP message. Each of the mobile device(s) receives the CMP message and changes to the indicated network and indicated service provider, if the mobile device is not already using the indicated network and service provider. If the mobile device is already using the indicated network, then the mobile device retains its use of the indicated network. If the mobile device is already using the indicated service provider, then the mobile device retains its use of the indicated service provider.

If global positioning device 104 (see FIG. 1) determines in step 508 that the last position in the j-th itinerary has not been reached by the vehicle, then the No branch of step 508 is taken and the process of FIG. 5 continues with step 510; otherwise, the Yes branch of step 508 is taken and the process of FIG. 5 ends at step 512. If the No branch of step 508 is taken, then in step 510 global positioning device 104 (see FIG. 1) updates the current position of the vehicle to be the next position in the j-th itinerary and the process of FIG. 5 continues starting at step 502.

In one embodiment, the present invention provides an itinerary optimization process that includes the sequence of processes of FIGS. 2, 3A, 4 and 5, in order.

Figure 6:
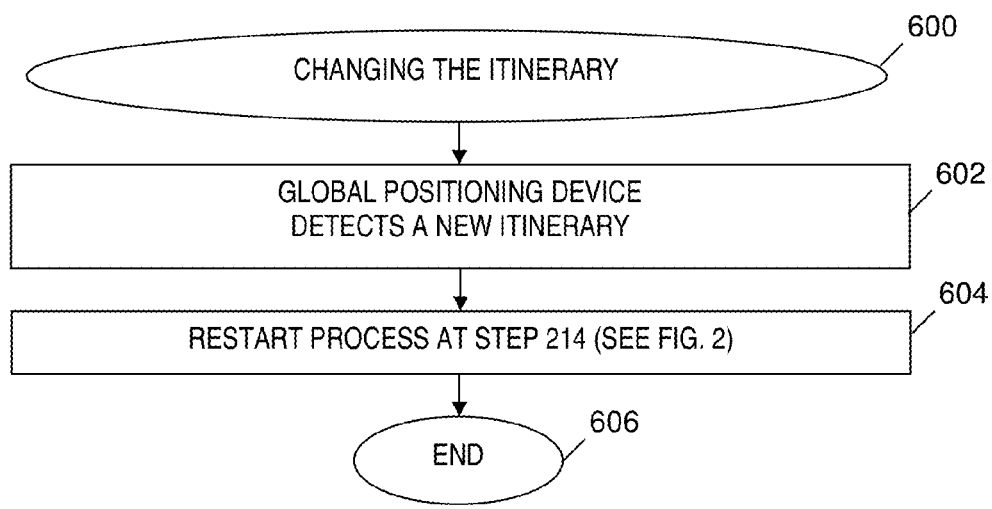
FIG. 6 is a flowchart of a process for changing the itinerary selected in the process of FIG. 4, in accordance with embodiments of the present invention.

FIG. 6 is a flowchart of a process for changing the itinerary selected in the process of FIG. 4, in accordance with embodiments of the present invention. The process of changing the itinerary starts at step 600. In step 602, global positioning device 104 (see FIG. 1) detects a new itinerary. In step 604, global positioning device 104 (see FIG. 1) restarts the CLIST generation process at step 214 of FIG. 2 by generating a CLIST message with a new current position. The CLIST message is sent to the central server 102 (see FIG. 1) in step 216 (see FIG. 2). The central server determines a new list of one or more optimized itineraries in step 308 (see FIG. 3A) based on the new current position in the new itinerary detected in step 602. The processes of FIGS. 4 and 5 are performed by the global positioning device 104 (see FIG. 1) using the new itinerary detected in step 602. The process of FIG. 6 ends at step 606.

EXAMPLES

Figure 7A:
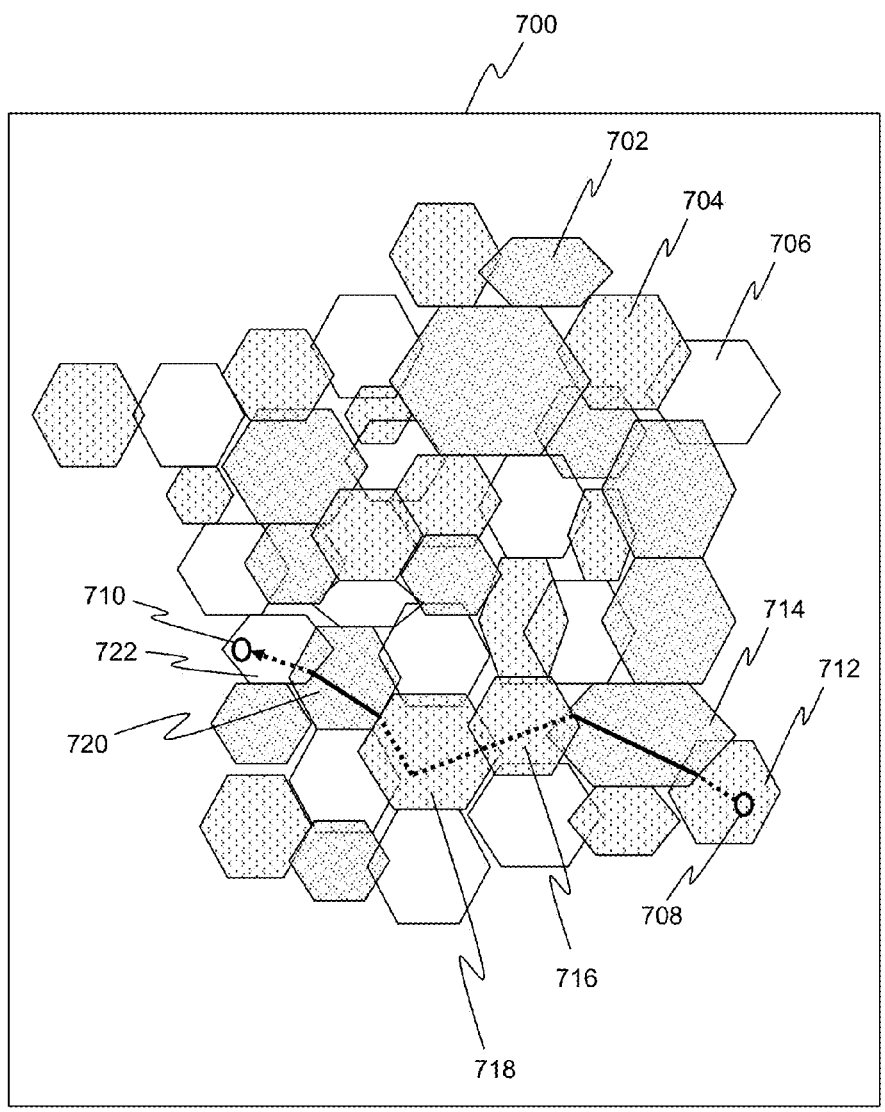
FIG. 7A is an exemplary signal coverage map for a first service provider overlaid by a first exemplary itinerary generated by the processes of FIGS. 3A and 3B, in accordance with embodiments of the present invention.

FIG. 7A is an exemplary signal coverage map for a first service provider overlaid by a first exemplary itinerary generated by the processes of FIGS. 3A and 3B, in accordance with embodiments of the present invention. Signal coverage map 700 is a map of signal coverage provided by the first service provider via a first network (e.g., DVB-H). Signal coverage map 700 includes hexagon-shaped cells, where each hexagon-shaped cell includes a fill pattern selected from a group of three fill patterns: dots, dashed lines, and white. The dots fill pattern includes black dots, is exemplified by cell 702, and indicates a cell whose signal coverage provided by the first service provider via the first network has a signal quality greater than or equal to 80% and less than or equal to 100%. The dashed lines fill pattern includes vertical black dashed lines, is exemplified by cell 704, and indicates a cell whose signal coverage provided by the first service provider via the first network has a signal quality greater than or equal to 50% and less than 80%. The white fill pattern is a completely white pattern that has no black fill pattern, is exemplified by cell 706, and indicates a cell whose signal coverage provided by the first service provider via the first network has a signal quality less than 50%.

The first exemplary itinerary overlaying map 700 has a starting point 708 and a destination 710, and includes a sequence of paths that pass through cells 712, 714, 716, 718, 720, and 722, in order. Each path in the first exemplary itinerary overlaying map 700 is indicated by either a solid black line or a dashed black line. The first service provider provides a service to a mobile device being transported by a vehicle that travels a path indicated by a solid black line in FIG. 7A. A second service provider provides the service to the mobile device as the vehicle travels a path indicated by a dashed black line in FIG. 7A. A discussion of a coverage map for the second service provider is presented below relative to FIG. 7B.

Figure 7B:
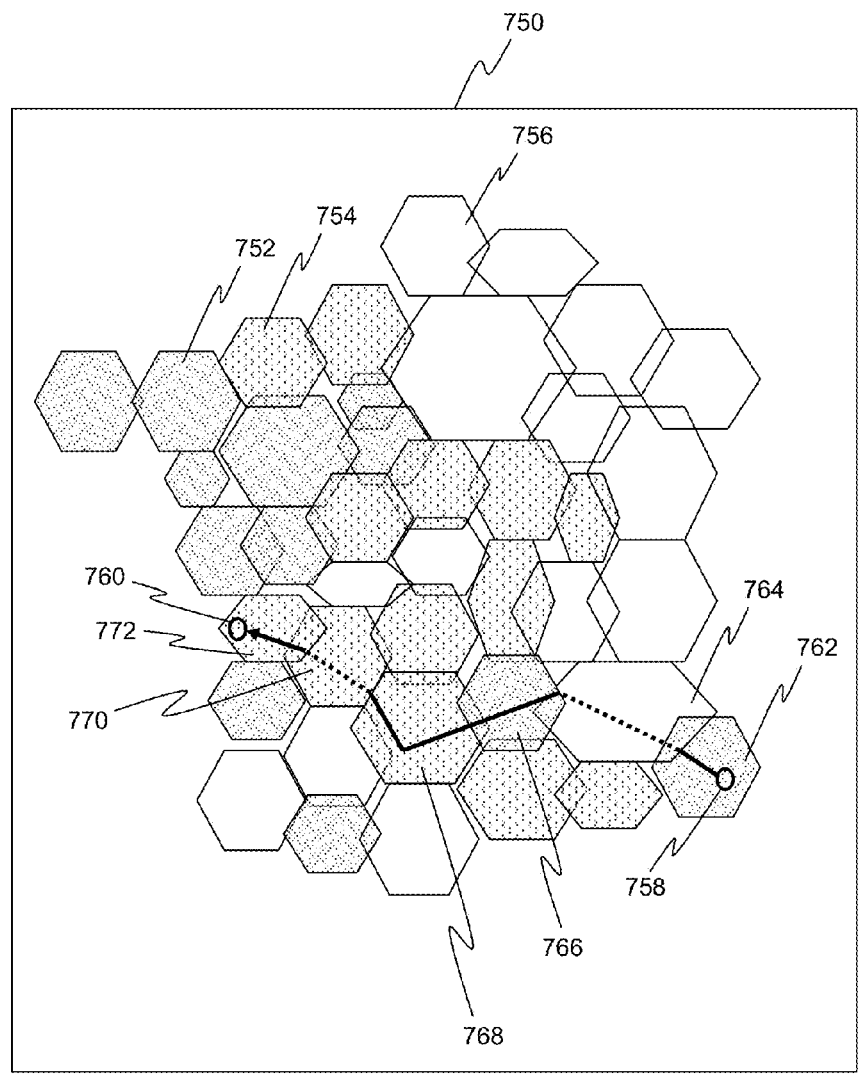
FIG. 7B is an exemplary signal coverage map for a second service provider overlaid by the first exemplary itinerary included in FIG. 7A, in accordance with embodiments of the present invention.

FIG. 7B is an exemplary signal coverage map for the second service provider overlaid by the first exemplary itinerary included in FIG. 7A, in accordance with embodiments of the present invention. Signal coverage map 750 is a map of signal coverage provided by the second service provider via the first network for the same geographic region shown in FIG. 7A. Signal coverage map 750 includes hexagon-shaped cells, where each hexagon-shaped cell includes a fill pattern selected from the same group of three fill patterns described above relative to FIG. 7A. The dots fill pattern is exemplified by cell 752 and indicates a cell as described above relative to cell 702 (see FIG. 7A). The dashed lines fill pattern is exemplified by cell 754 and indicates a cell as described above relative to cell 704 (see FIG. 7A). The white fill pattern is exemplified by cell 756 and indicates a cell as described above relative to cell 706 (see FIG. 7A).

The first exemplary itinerary overlaying signal coverage map 750 has a starting point 758 (i.e., the same point as starting point 708 of FIG. 7A) and a destination 760 (i.e., the same point as destination 710 of FIG. 7A), and includes a sequence of paths that pass through cells 762, 764, 766, 768, 770, and 772, in order. Cells 762, 764, 766, 768, 770, and 772 cover the same geographic regions as cells 712, 714, 716, 718, 720 and 722 in FIG. 7A, respectively. Each path in the first exemplary itinerary overlaying map 750 is indicated by either a solid black line or a dashed black line. The second service provider provides the service to the mobile device being transported by the vehicle that travels a path indicated by a solid black line in FIG. 7B. The service and the vehicle are the aforementioned service and vehicle discussed above relative to FIG. 7A. The first service provider provides the service to the mobile device as the vehicle travels a path indicated by a dashed black line in FIG. 7B. A discussion of a coverage map for the first service provider is presented above relative to FIG. 7A.

The first exemplary itinerary in FIGS. 7A and 7B includes an indication of the shortest path between starting point 708 (see FIG. 7A) and destination 710 (see FIG. 7A), as determined in step 322 (see FIG. 3B). Step 322 (see FIG. 3B) also includes a pre-selection of cell regions along the shortest path (i.e., cell regions covered by cells 712, 714, 716, 718, 720 and 722 of FIG. 7A and cells 762, 764, 766, 768, 770 and 772 are pre-selected). The first iteration of a loop starting with step 324 (see FIG. 3B) selects the cell region that includes starting point 708 (see FIG. 7A) to be the current cell and retrieves from a data store the signal quality provided to the current cell by the first service provider (i.e., the signal quality indicated by the dashed lines fill pattern of cell 712 of FIG. 7A) and the signal quality provided to the current cell by the second service provider (i.e., the signal quality indicated by the dots fill pattern of cell 762). In step 326, the second service provider is identified as providing the best signal quality for the current cell because the dots fill pattern (i.e., signal quality between 80% and 100%) in cell 762 associated with the second service provider indicates a signal quality that is better than the signal quality indicated by the dashed lines fill pattern (i.e., signal quality between 50% and 80%) in cell 712 (see FIG. 7A).

Step 328 (see FIG. 3B) determines that there is at least one more cell region along the shortest path that has not yet been selected in step 324 (see FIG. 3B) and the next iteration of the loop starting at step 324 (see FIG. 3B) selects the next cell region (i.e., the cell region covered by cell 714 of FIG. 7A and cell 764) along the shortest path to be the current cell. The signal quality between 80% and 100% for the first service provider in cell 714 (see FIG. 7A) and the signal quality less than 50% for the second service provider in cell 764 are retrieved from a data store.

In step 326 (see FIG. 3B) of the second iteration of the loop, the first service provider is identified as providing the best signal quality for the current cell because the dots fill pattern (i.e., signal quality between 80% and 100%) in cell 714 (see FIG. 7A) associated with the first service provider indicates a signal quality that is better than the signal quality indicated by the white fill pattern (i.e., signal quality less than 50%) in cell 764.

A third through a sixth iteration of the loop starting at step 324 (see FIG. 3B) is performed. In the third iteration of the loop starting at step 324 (see FIG. 3B), the second service provider is identified in step 326 (see FIG. 3B) as providing the best signal quality in the cell region covered by cell 766. In the fourth iteration, the second service provider is identified in step 326 (see FIG. 3B) as providing the best signal quality in the cell region covered by cell 768 as a result of applying a predefined rule for designating a service provider with the best signal quality when there are two service providers that provide the same best level of signal quality. In the fourth iteration, both the first and second service providers provide the service with a signal quality between 50% and 80%. In the fifth iteration, the first service provider is identified in step 326 (see FIG. 3B) as providing the best signal quality in the cell region covered by cell 720 (see FIG. 7A). Finally, in the sixth and final iteration, the second service provider is identified in step 326 (see FIG. 3B) as providing the best signal quality in the cell region covered by cell 772.

In step 328 (see FIG. 3B) of the sixth iteration, the central server determines that all of the cells along the shortest path have been selected in step 324 (see FIG. 3B) and therefore, the No branch of step 328 (see FIG. 3B) is taken. In step 330 (see FIG. 3B), the central server completes a determination of an optimal itinerary by indicating hops in a set of parameters that specify the optimal itinerary. The hops specify geographic locations at which connectivity changes are to occur. A first hop indicated in step 330 (see FIG. 3B) is the location at which the dashed line in cell 712 (see FIG. 7A) meets the solid line in cell 714 (see FIG. 7A). The first hop is a location at which the mobile device automatically changes its connection from being connected to the second service provider to being connected to the first service provider. That is, prior to the vehicle reaching the first hop and while the vehicle is traveling in cell 762, the mobile device receives the service from the second service provider and when the vehicle is detected as being at the first hop, the mobile device initiates a connection with the first service provider and terminates its connection with the second service provider.

A second hop indicated in step 330 (see FIG. 3B) is the location at which the solid line in cell 714 (see FIG. 7A) meets the dashed line in cell 716 (see FIG. 7A). The second hop is a location at which the mobile device automatically changes its connection from being connected to the first service provider to being connected to the second service provider. That is, prior to the vehicle reaching the second hop, while the vehicle is traveling in cell 714 (see FIG. 7A), and after the vehicle passes the first hop, the mobile device receives the service from the first service provider. In response to the vehicle being detected at the second hop, the mobile device initiates a connection with the second service provider and terminates its connection with the first service provider.

A third hop indicated in step 330 (see FIG. 3B) is the location at which the dashed line in cell 718 (see FIG. 7A) meets the solid line in cell 720 (see FIG. 7A). The third hop is a location at which the mobile device automatically changes its connection from being connected to the second service provider to being connected to the first service provider. That is, prior to the vehicle reaching the third hop, while the vehicle is traveling in cells 716 and 718 (see FIG. 7A), and after the vehicle passes the second hop, the mobile device receives the service from the second service provider. In response to the vehicle being detected at the third hop, the mobile device initiates a connection with the first service provider and terminates its connection with the second service provider.

A fourth hop indicated in step 330 (see FIG. 3B) is the location at which the solid line in cell 720 (see FIG. 7A) meets the dashed line in cell 722 (see FIG. 7A). The fourth hop is a location at which the mobile device automatically changes its connection from being connected to the first service provider to being connected to the second service provider. That is, prior to the vehicle reaching the fourth hop, while the vehicle is traveling in cell 720 (see FIG. 7A), and after the vehicle passes the third hop, the mobile device receives the service from the first service provider. In response to the vehicle being detected at the fourth hop, the mobile device initiates a connection with the second service provider and terminates its connection with the first service provider.

Figure 8A:
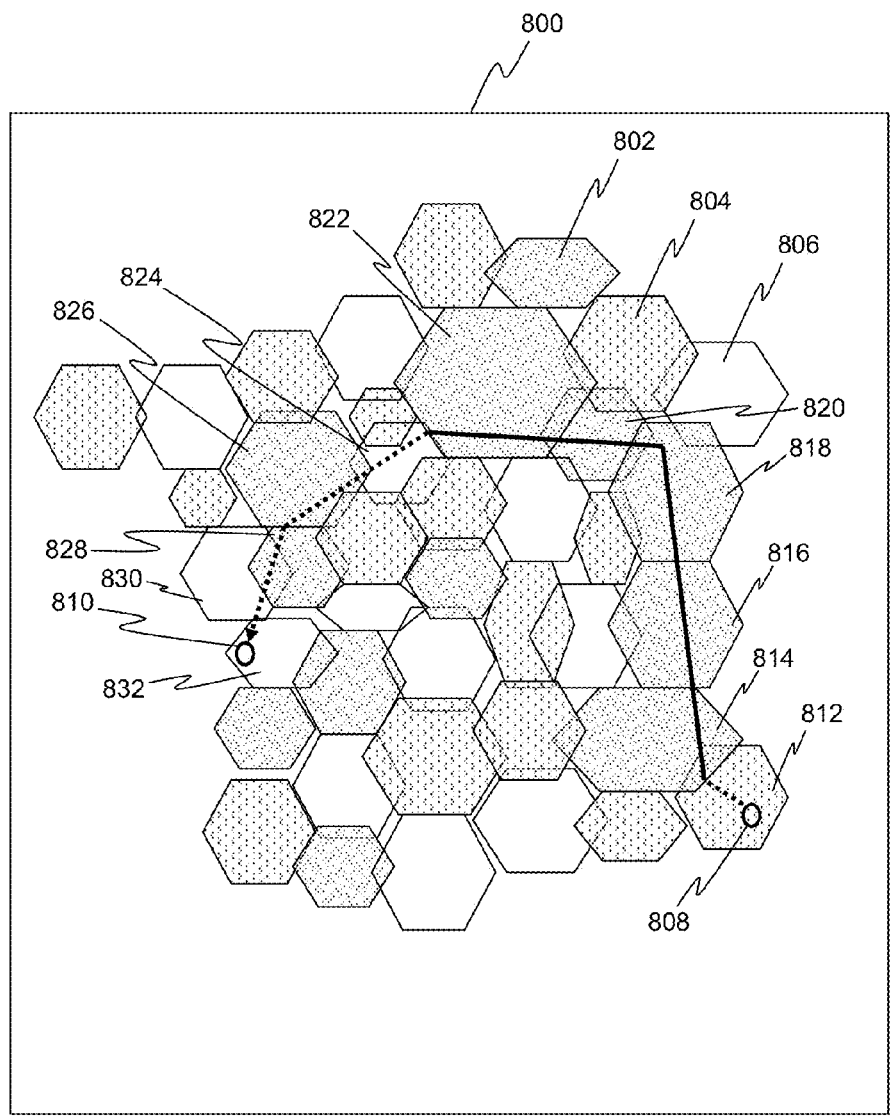
FIG. 8A is the signal coverage map of FIG. 7A overlaid by a second exemplary itinerary generated by the processes of FIGS. 3A and 3C, in accordance with embodiments of the present invention.

FIG. 8A is the signal coverage map of FIG. 7A overlaid by a second exemplary itinerary generated by the processes of FIGS. 3A and 3C, in accordance with embodiments of the present invention. Signal coverage map 800 is a map of signal coverage provided by the first service provider via a first network (e.g., DVB-H). Signal coverage map 800 includes hexagon-shaped cells, where each hexagon-shaped cell includes a fill pattern selected from the same group of three fill patterns described above relative to FIG. 7A. The dots fill pattern is exemplified by cell 802 and indicates a cell as described above relative to cell 702 (see FIG. 7A). The dashed lines fill pattern is exemplified by cell 804 and indicates a cell as described above relative to cell 704 (see FIG. 7A). The white fill pattern is exemplified by cell 806 and indicates a cell as described above relative to cell 706 (see FIG. 7A).

The second exemplary itinerary overlaying map 800 has a starting point 808 and a destination 810, and includes a sequence of paths that pass through cells 812, 814, 816, 818, 820, 822, 824, 826, 828, 830 and 832, in order. Each path in the second exemplary itinerary overlaying map 800 is indicated by either a solid black line or a dashed black line. The first service provider provides a service to a mobile device being transported by a vehicle that travels a path indicated by a solid black line in FIG. 8A. A second service provider provides the service to the mobile device as the vehicle travels a path indicated by a dashed black line in FIG. 8A. A discussion of a coverage map for the second service provider with the second exemplary itinerary overlaid is presented below relative to FIG. 8B.

Figure 8B:
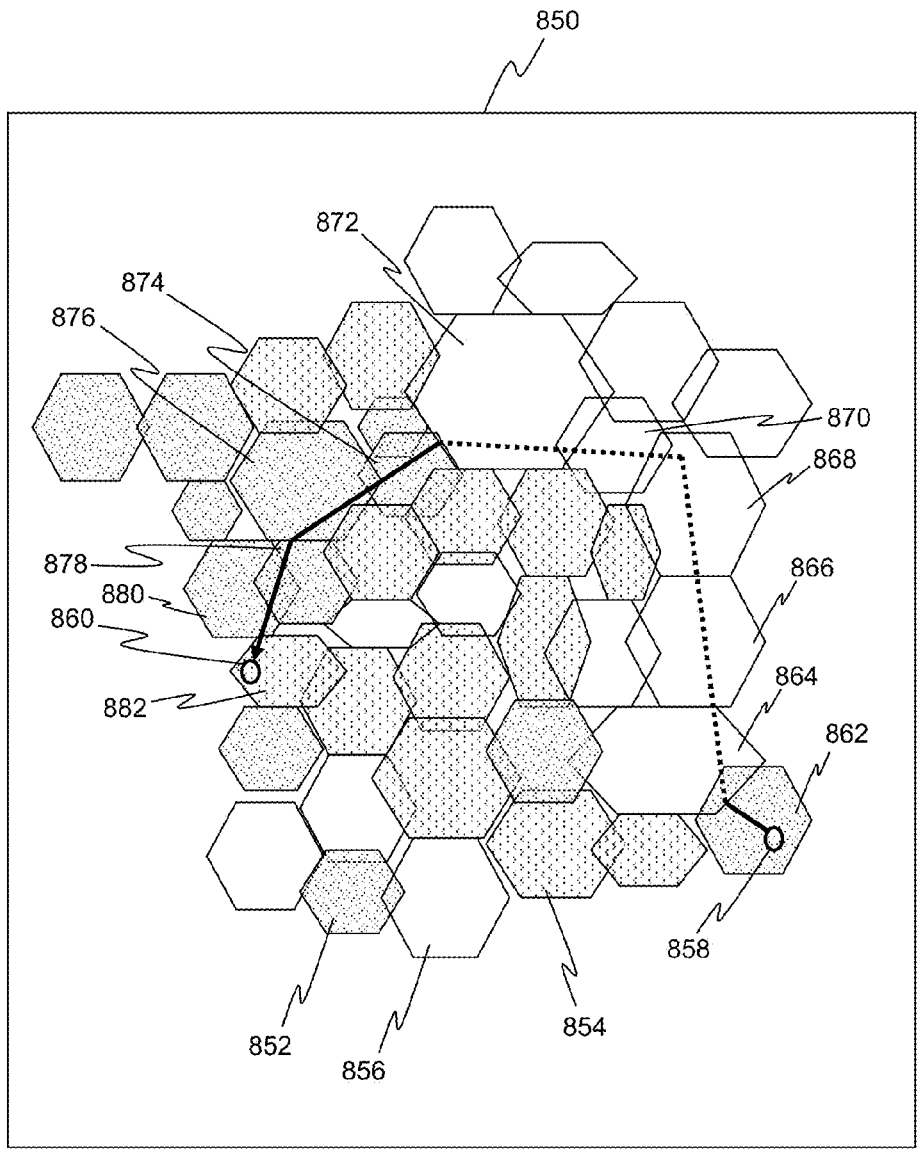
FIG. 8B is the signal coverage map of FIG. 7B overlaid by the second exemplary itinerary included in FIG. 8A, in accordance with embodiments of the present invention.

FIG. 8B is the signal coverage map of FIG. 7B overlaid by the second exemplary itinerary included in FIG. 8A, in accordance with embodiments of the present invention. Signal coverage map 850 is a map of signal coverage provided by the second service provider via the first network for the same geographic region shown in FIG. 8A. Signal coverage map 850 includes hexagon-shaped cells, where each hexagon-shaped cell includes a fill pattern selected from the same group of three fill patterns described above relative to FIG. 7A. The dots fill pattern is exemplified by cell 852 and indicates a cell as described above relative to cell 702 (see FIG. 7A). The dashed lines fill pattern is exemplified by cell 854 and indicates a cell as described above relative to cell 704 (see FIG. 7A). The white fill pattern is exemplified by cell 856 and indicates a cell as described above relative to cell 706 (see FIG. 7A).

The second exemplary itinerary overlaying signal coverage map 850 has a starting point 858 (i.e., the same point as starting point 808 of FIG. 8A) and a destination 860 (i.e., the same point as destination 810 of FIG. 8A), and includes a sequence of paths that pass through cells 862, 864, 866, 868, 870, 872, 874, 876, 878, 880 and 882, in order. Cells 862, 864, 866, 868, 870, 872, 874, 876, 878, 880 and 882 cover the same geographic regions as cells 812, 814, 816, 818, 820, 822, 824, 826, 828, 830 and 832 in FIG. 8A, respectively. Each path in the second exemplary itinerary overlaying map 850 is indicated by either a solid black line or a dashed black line. The second service provider provides the service to the mobile device being transported by the vehicle that travels a path indicated by a solid black line in FIG. 8B. The service and the vehicle are the aforementioned service and vehicle discussed above relative to FIG. 8A. The first service provider provides the service to the mobile device as the vehicle travels a path indicated by a dashed black line in FIG. 8B. A discussion of a coverage map for the first service provider with the second exemplary itinerary overlaid is presented above relative to FIG. 8A.

The second exemplary itinerary in FIGS. 8A and 8B includes an indication of a plurality of paths between starting point 808 (see FIG. 8A) and destination 810 (see FIG. 8A), as determined in the process of FIG. 3C. Step 342 (see FIG. 3C) includes an identification of the initial current cell 862 and an identification of the second service provider as providing the best signal quality in the initial current cell. The first iteration of a loop starting with step 344 (see FIG. 3C) retrieves the signal quality for each service provider in each cell adjacent to the current cell. In step 346 (see FIG. 3C), the first service provider is identified as providing in cell 814 (see FIG. 8A) the best signal quality of the signal quality values retrieved in step 344 (see FIG. 3C). Also in step 346 (see FIG. 3C), the central server selects cell 814 (see FIG. 8A) to be the next cell. In step 348 (see FIG. 3C), the central server determines a path within the next cell selected in step 346 (see FIG. 3C), and saves the path in a computer memory or data store. Step 350 (see FIG. 3C) determines that the destination is not included in the next cell selected in step 346 (see FIG. 3C).

In step 352 (see FIG. 3C), the current cell is updated to be the next cell selected in step 346 (see FIG. 3C). The second iteration of the loop starts at step 344 (see FIG. 3C). The second through tenth iterations of the loop starting at step 344 (see FIG. 3C) include identifying the following service providers: the first service provider in the second through fifth iterations (i.e., providing the best signal quality in cells 816 (see FIG. 8A), 818 (see FIG. 8A), 820 (see FIG. 8A), 822 (see FIG. 8A)) and the second service provider in the sixth through tenth iterations (i.e., providing the best signal quality in cells 874, 876, 878, 880 and 882).

In step 350 (see FIG. 3C) of the tenth iteration, the central server determines that the next cell (i.e., cell 882) selected in step 346 (see FIG. 3C) of the tenth iteration includes the destination 860 and therefore, the Yes branch of step 350 (see FIG. 3C) is taken. In step 354 (see FIG. 3C), the central server completes a determination of an optimal itinerary by indicating hops in a set of parameters that specify the optimal itinerary. The hops specify geographic locations at which connectivity changes are to occur. A first hop indicated in step 354 (see FIG. 3C) is the location at which the dashed line in cell 812 (see FIG. 8A) meets the solid line in cell 814 (see FIG. 8A). The first hop is a location at which the mobile device automatically changes its connection from being connected to the second service provider to being connected to the first service provider. That is, prior to the vehicle reaching the first hop and while the vehicle is traveling in cell 862, the mobile device receives the service from the second service provider and when the vehicle is detected as being at the first hop, the mobile device initiates a connection with the first service provider and terminates its connection with the second service provider.

A second hop indicated in step 354 (see FIG. 3C) is the location at which the solid line in cell 822 (see FIG. 8A) meets the dashed line in cell 824 (see FIG. 8A). The second hop is a location at which the mobile device automatically changes its connection from being connected to the first service provider to being connected to the second service provider. That is, prior to the vehicle reaching the second hop, while the vehicle is traveling in cell 822 (see FIG. 8A), and after the vehicle passes the first hop, the mobile device receives the service from the first service provider. In response to the vehicle being detected at the second hop, the mobile device initiates a connection with the second service provider and terminates its connection with the first service provider.

The second exemplary itinerary shown in FIGS. 8A and 8B is longer than the first exemplary itinerary shown in FIGS. 7A and 7B, but is generated from paths selected without a shortest path constraint and so that the mobile device receives the best quality of signal on each path from either the first or second service provider. That is, the second exemplary itinerary includes solid line paths in a maximized number of cells having the dots fill pattern.

Extensions

Although the systems and methods disclosed above describe embodiments of the present invention in terms of a trip that uses one vehicle, one mode of transportation, and a global positioning device that is based in the one vehicle, embodiments of the present invention contemplate a trip that may employ multiple vehicles (i.e., a multi-vehicle trip) and/or multiple modes of transportation (i.e., a multi-modal trip), where the global positioning device may be transferred from one vehicle (or one mode of transport) to another or where information (e.g., parameters of a selected itinerary) stored by a first global positioning device in one vehicle may be transmitted to a second global positioning device in a second vehicle. For example, a traveler requires the use of a mobile device throughout a trip that consists of traveling by car in a first city to a first train station, taking a train from the first train station to a second train station in a second city, and finally taking a taxi from the second train station to a hotel. In this example, the current position included in the CLIST message is the current position of the vehicle in which the traveler is currently traveling, the optimal itineraries are generated with further constraints based on the particular vehicles to be used by the traveler, and the traveler carries a global positioning device from the car to the train and finally to the taxi so that the hops determined for the selected optimal itinerary are known throughout the trip and can be used to direct a connectivity change when the mobile device is in any of the vehicles (i.e., the car, the train or the taxi).

As another example, a traveler takes a multi-modal trip in which the traveler uses a mobile device when traveling by car and then when walking to a final destination. In the example of this paragraph, the current position included in the CLIST message is the current position of the car when the traveler is traveling by car and the current position of the traveler when the traveler is a pedestrian.

Furthermore, the optimal itineraries generated in the process of FIG. 3A may include only single-vehicle itineraries, only multi-modal itineraries, only multi-vehicle itineraries, or a combination thereof.

In another contemplated embodiment not shown in FIG. 1, a variant of system 100 does not include a central server 102 that collects connection information per service 112. Instead one or more remote computer systems (e.g., computer systems managed by service providers) periodically send connection information per service to global positioning device 104 and global positioning device includes logic that analyzes the connection information and map information to generate optimal itineraries.

Computer System

Figure 9:
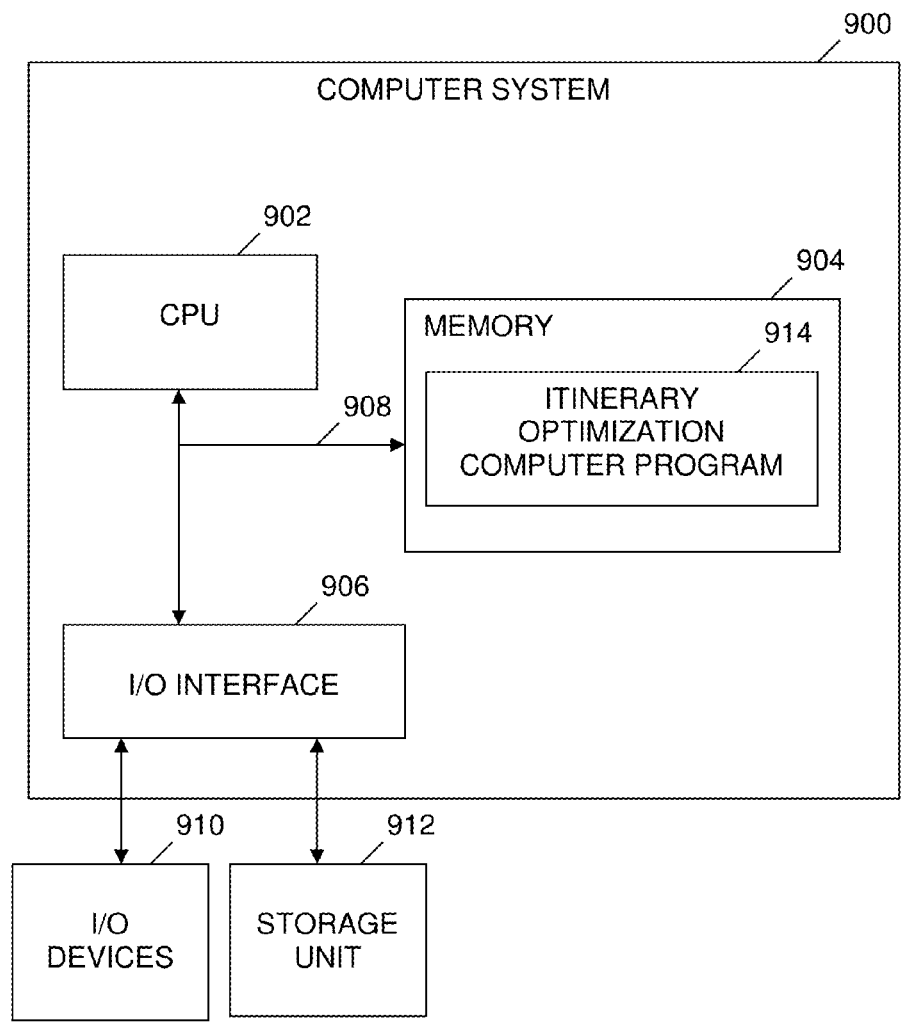
FIG. 9 is a computer system that is included in the system of FIG. 1 and that implements a process of FIG. 1, 3A, 3B, 3C, 4, 5 or 6, or a combination thereof, in accordance with embodiments of the present invention.

FIG. 9 is a computer system that is included in the system of FIG. 1 and that implements a process of FIG. 1, 3A, 3B, 3C, 4, 5 or 6, or a combination thereof, in accordance with embodiments of the present invention. Computer system 900 generally comprises a central processing unit (CPU) 902, a memory 904, an input/output (I/O) interface 906, and a bus 908. In one embodiment, computer system 900 is connection management server computer system 102 (see FIG. 1). In another embodiment, computer system 900 is global positioning device 104 (see FIG. 1). Further, computer system 900 is coupled to I/O devices 910 and a computer data storage unit 912. CPU 902 performs computation and control functions of computer system 900. CPU 902 may comprise a single processing unit, or be distributed across one or more processing units in one or more locations (e.g., on a client and server).

Memory 904 may comprise any known type of computer data storage and/or transmission media, including bulk storage, magnetic media, optical media, random access memory (RAM), read-only memory (ROM), a data cache, a data object, etc. In one embodiment, cache memory elements of memory 904 provide temporary storage of at least some program code (e.g., code 914) in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computer system 900, and may comprise any type of transmission link, including electrical, optical, wireless, etc.

I/O interface 906 also allows computer system 900 to store and retrieve information (e.g., data or program instructions such as code 914) from an auxiliary storage device such as computer data storage unit 912 or another computer data storage unit (not shown). Computer data storage unit 912 may be a non-volatile storage device, such as a magnetic disk drive (i.e., hard disk drive) or an optical disc drive (e.g., a CD-ROM drive which receives a CD-ROM disk).

Memory 904 includes computer program code 914 that provides the logic for an itinerary optimization process that optimizes network connections for services requested for mobile devices (e.g., the process of FIG. 2, 3A, 3B, 3C, 4, 5 or 6). In one embodiment, code 914 is included in central server 102 (see FIG. 1) and provides logic for the process of FIG. 3A. In another embodiment, code 914 is included in global positioning device 104 (see FIG. 1) and provides logic for the processes of FIGS. 2 and 4-6. Further, memory 904 may include other systems not shown in FIG. 9, such as an operating system (e.g., Linux) that runs on CPU 902 and provides control of various components within and/or connected to computer system 900.

Memory 904, storage unit 912, and/or one or more other computer data storage units (not shown) that are coupled to computer system 900 may store map information 110 (see FIG. 1), connection information per service 112 (see FIG. 1), values included in a CLIST message generated by the process of FIG. 2, sets of parameters (including hops and paths) that specify optimal itineraries generated in the process of FIG. 3A, the optimal itinerary selected in the process of FIG. 4, and values included in a CMP message generated by the process of FIG. 5.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computer system 900). Furthermore, an embodiment of the present invention may take the form of a computer program product embodied in any tangible medium of expression (e.g., memory 904 or computer data storage unit 912) having computer-usable program code (e.g., code 914) embodied or stored in the medium.

Any combination of one or more computer-usable or computer-readable medium(s) (e.g., memory 904 and computer data storage unit 912) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 914 is printed, as the program 914 can be electronically captured via, for instance, optical scanning of the paper or other medium, then compiled, interpreted, or otherwise processed in a suitable manner, if necessary, and then stored in a computer memory 904. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 914) embodied therewith, either in baseband or as part of a carrier wave. The computer-usable program code may be transmitted using any appropriate medium, including but not limited to wireless, wireline, optical fiber cable, RF, etc.

Computer program code (e.g., code 914) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer system 900). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2, 3A-3C, and 4-6) and/or block diagrams of methods, apparatus (systems) (e.g., FIG. 1 and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 914). These computer program instructions may be provided to a processor (e.g., CPU 902) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904 or computer data storage unit 912) that can direct a computer (e.g., computer system 900) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 900) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the itinerary optimization process. Thus, an embodiment of the present invention discloses a process for supporting computer infrastructure, comprising integrating, hosting, maintaining and deploying computer-readable code (e.g., code 914) into a computer system (e.g., computer system 900), wherein the code in combination with the computer system is capable of performing an itinerary optimization process.

In another embodiment, the invention provides a business method that performs the process steps of the invention on a subscription, advertising and/or fee basis. That is, a service provider, such as a Solution Integrator, can offer to create, maintain, support, etc. an itinerary optimization process. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2, 3A-3C, and 4-6 and the block diagrams in FIG. 1 and FIG. 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 914), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating optimal itineraries, the method comprising the steps of:
a global positioning device receiving a destination of a vehicle on a trip, a service requested for a mobile device being transported by the vehicle, a plurality of service providers that provide the service, and one or more networks via which the plurality of service providers provide the service to the mobile device, the global positioning device being transported by the vehicle, the global positioning device being a first computer system, and the plurality of service providers providing the service to the mobile device in a first cell determined by a second computer system;

the global positioning device determining a geographic position of the vehicle;

subsequent to the step of receiving the destination and determining the position, the global positioning device sending a first message to the second computer system that is remote from the vehicle, wherein the first message indicates the geographic position of the vehicle, the destination of the trip, the service, the plurality of service providers, and the one or more networks;

the global positioning device receiving a second message as a response to the first message, wherein the second message indicates a plurality of optimal itineraries generated by the second computer system;

the global positioning device extracting the plurality of optimal itineraries from the second message;

subsequent to the step of extracting the plurality of optimal itineraries, the global positioning device generating and displaying a plurality of choices identifying the plurality of optimal itineraries on a display device;

subsequent to the step of displaying the plurality of choices, the global positioning device receiving a selection by a user of a choice of the plurality of choices, wherein the selection identifies an optimal itinerary of the plurality of optimal itineraries, wherein the optimal itinerary is determined by the second computer system as including a sequence of a first path followed by a second path, a hop, an updated service provider of the plurality of service providers, and an updated network of the one or more networks, the hop indicating a position on the first path at which a connectivity change is to occur from an initial service provider providing the service to the updated service provider providing the service and from an initial network via which the service is provided to the mobile device to the updated network via which the service is provided to the mobile device, wherein the optimal itinerary is determined by the second computer system in part based on a first signal quality provided by the initial service provider to any mobile device in a second cell not being exceeded by any other signal quality indicated by any other measure of network connectivity included in a first plurality of measures of network connectivity and in part based on a second signal quality provided by the updated service provider to any mobile device in a third cell not being exceeded by any other signal quality indicated by any other measure of network connectivity included in a second plurality of measures of network connectivity, the second cell being included in a first plurality of cells adjacent to the first cell, wherein the first signal quality provided by the initial service provider to any mobile device in the second cell is indicated by a first measure of network connectivity included in the first plurality of measures of network connectivity, which is determined by the second computer system, wherein the second signal quality provided by the updated service provider to any mobile device in the third cell is indicated by a second measure of network connectivity included in the second plurality of measures of network connectivity, which is determined by the second computer system, wherein the second path is determined within the third cell by the second computer system, wherein the third cell is selected by the second computer system from a second plurality of cells adjacent to the second cell and the updated service provider is identified within the plurality of service providers by the second computer system, based on the second signal quality provided by the updated service provider to any other mobile device in the third cell not being exceeded by any other signal quality indicated by any other measure of network connectivity of the second plurality of measures of network connectivity, wherein the second plurality of measures of network connectivity is retrieved by the second computer system after the second computer system selects the second cell for each respective cell of the second plurality of cells adjacent to the second cell, each measure of network connectivity included in the second plurality of measures of network connectivity indicating a respective signal quality provided by a respective service provider of the plurality of service providers to any mobile device in a respective cell of the second plurality of cells adjacent to the second cell, wherein the first path is determined within the second cell by the second computer system, wherein the initial service provider is identified within the plurality of service providers and the second cell is selected from the first plurality of cells adjacent to the first cell by the second computer system, based on the first signal quality provided by the initial service provider to any mobile device in the second cell not being exceeded by any other signal quality indicated by any other measure of network connectivity of the first plurality of measures of network connectivity, and wherein the first plurality of measures of network connectivity is retrieved by the second computer system for each respective cell of the first plurality of cells adjacent to the first cell, each measure of network connectivity being included in the first plurality of measures of network connectivity and indicating a respective signal quality provided by a respective service provider of the plurality of service providers to any mobile device in the respective cell;

in response to the step of receiving the selection, the global positioning device storing the optimal itinerary in a computer memory;

the global positioning device detecting that the vehicle is located at the position indicated by the hop;

in response to the step of detecting that the vehicle is located at the position indicated by the hop, the global positioning device generating a third message indicating the updated service provider and the updated network; and the global positioning device sending the third message to the mobile device, wherein a result of the step of sending the third message and the step of receiving the selection identifying the optimal itinerary includes the mobile device making the connectivity change.

2. The method of claim 1, wherein the step of sending the first message includes sending the first message that further indicates a time window during which the service is requested to be provided to the mobile device, wherein the result of the step of sending the third message includes the mobile device making the connectivity change based on the initial service provider and the initial network providing the service within the time window indicated by the first message and based on the updated service provider and the updated network providing the service within the time window indicated by the first message, and wherein the time window indicates a period of time during which the service is required by the mobile device.

3. The method of claim 1, wherein the step of sending the first message includes sending the first message that indicates a cost requirement of the service, wherein the result of the step of sending the third message includes the mobile device making the connectivity change based on the initial service provider and the initial network providing the service at a first cost that does not exceed the cost requirement, and based on the updated service provider and the updated network providing the service at a second cost that does not exceed the cost requirement, and wherein the cost requirement indicates a maximum cost of providing the service to the mobile device.

4. A first computer system comprising:
a central processing unit (CPU);
a memory coupled to the CPU; and
a computer-readable, tangible storage device coupled to the CPU, the storage device containing instructions that when carried out by the CPU via the memory implement a method of generating optimal itineraries, the method comprising the steps of:
a global positioning device receiving a destination of a vehicle on a trip, a service requested for a mobile device being transported by the vehicle, a plurality of service providers that provide the service, and one or more networks via which the plurality of service providers provide the service to the mobile device, the global positioning device being transported by the vehicle, the global positioning device being the first computer system, and the plurality of service providers providing the service to the mobile device in a first cell determined by a second computer system;
the global positioning device determining a geographic position of the vehicle;
subsequent to the step of receiving the destination and determining the position, the global positioning device sending a first message to the second computer system that is remote from the vehicle, wherein the first message indicates the geographic position of the vehicle, the destination of the trip, the service, the plurality of service providers, and the one or more networks;
the global positioning device receiving a second message as a response to the first message, wherein the second message indicates a plurality of optimal itineraries generated by the second computer system;
the global positioning device extracting the plurality of optimal itineraries from the second message;
subsequent to the step of extracting the plurality of optimal itineraries, the global positioning device generating and displaying a plurality of choices identifying the plurality of optimal itineraries on a display device;
subsequent to the step of displaying the plurality of choices, the global positioning device receiving a selection by a user of a choice of the plurality of choices, wherein the selection identifies an optimal itinerary of the plurality of optimal itineraries, wherein the optimal itinerary is determined by the second computer system as including a sequence of a first path followed by a second path, a hop, an updated service provider of the plurality of service providers, and an updated network of the one or more networks, the hop indicating a position on the first path at which a connectivity change is to occur from an initial service provider providing the service to the updated service provider providing the service and from an initial network via which the service is provided to the mobile device to the updated network via which the service is provided to the mobile device,
wherein the optimal itinerary is determined by the second computer system in part based on a first signal quality provided by the initial service provider to any mobile device in a second cell not being exceeded by any other signal quality indicated by any other measure of network connectivity included in a first plurality of measures of network connectivity and in part based on a second signal quality provided by the updated service provider to any mobile device in a third cell not being exceeded by any other signal quality indicated by any other measure of network connectivity included in a second plurality of measures of network connectivity, the second cell being included in a first plurality of cells adjacent to the first cell,
wherein the first signal quality provided by the initial service provider to any mobile device in the second cell is indicated by a first measure of network connectivity included in the first plurality of measures of network connectivity, which is determined by the second computer system,
wherein the second signal quality provided by the updated service provider to any mobile device in the third cell is indicated by a second measure of network connectivity included in the second plurality of measures of network connectivity, which is determined by the second computer system,
wherein the second path is determined within the third cell by the second computer system,
wherein the third cell is selected by the second computer system from a second plurality of cells adjacent to the second cell and the updated service provider is identified within the plurality of service providers by the second computer system, based on the second signal quality provided by the updated service provider to any other mobile device in the third cell not being exceeded by any other signal quality indicated by any other measure of network connectivity of the second plurality of measures of network connectivity,
wherein the second plurality of measures of network connectivity is retrieved by the second computer system after the second computer system selects the second cell for each respective cell of the second plurality of cells adjacent to the second cell, each measure of network connectivity included in the second plurality of measures of network connectivity indicating a respective signal quality provided by a respective service provider of the plurality of service providers to any mobile device in a respective cell of the second plurality of cells adjacent to the second cell,
wherein the first path is determined within the second cell by the second computer system,
wherein the initial service provider is identified within the plurality of service providers and the second cell is selected from the first plurality of cells adjacent to the first cell by the second computer system, based on the first signal quality provided by the initial service provider to any mobile device in the second cell not being exceeded by any other signal quality indicated by any other measure of network connectivity of the first plurality of measures of network connectivity, and
wherein the first plurality of measures of network connectivity is retrieved by the second computer system for each respective cell of the first plurality of cells adjacent to the first cell, each measure of network connectivity being included in the first plurality of measures of network connectivity and indicating a respective signal quality provided by a respective service provider of the plurality of service providers to any mobile device in the respective cell;

in response to the step of receiving the selection, the global positioning device storing the optimal itinerary in a computer memory;

the global positioning device detecting that the vehicle is located at the position indicated by the hop;

in response to the step of detecting that the vehicle is located at the position indicated by the hop, the global positioning device generating a third message indicating the updated service provider and the updated network; and the global positioning device sending the third message to the mobile device, wherein a result of the step of sending the third message and the step of receiving the selection identifying the optimal itinerary includes the mobile device making the connectivity change.

5. The first computer system of claim 4, wherein the step of sending the first message includes sending the first message that further indicates a time window during which the service is requested to be provided to the mobile device, wherein the result of the step of sending the third message includes the mobile device making the connectivity change based on the initial service provider and the initial network providing the service within the time window indicated by the first message and based on the updated service provider and the updated network providing the service within the time window indicated by the first message, and wherein the time window indicates a period of time during which the service is required by the mobile device.

6. The first computer system of claim 4, wherein the step of sending the first message includes sending the first message that indicates a cost requirement of the service, wherein the result of the step of sending the third message includes the mobile device making the connectivity change based on the initial service provider and the initial network providing the service at a first cost that does not exceed the cost requirement, and based on the updated service provider and the updated network providing the service at a second cost that does not exceed the cost requirement, and wherein the cost requirement indicates a maximum cost of providing the service to the mobile device.

7. A computer program product, comprising:

a computer-readable, tangible storage device that is not a transitory signal propagation medium; and a computer-readable program code stored on the computer-readable, tangible storage device, said computer-readable program code containing instructions that, when executed by a processor of a first computer system, implement a method of generating optimal itineraries, said method comprising the steps of:

a global positioning device receiving a destination of a vehicle on a trip, a service requested for a mobile device being transported by the vehicle, a plurality of service providers that provide the service, and one or more networks via which the plurality of service providers provide the service to the mobile device, the global positioning device being transported by the vehicle, the global positioning device being the first computer system, and the plurality of service providers providing the service to the mobile device in a first cell determined by a second computer system;

the global positioning device determining a geographic position of the vehicle;

subsequent to the step of receiving the destination and determining the position, the global positioning device sending a first message to the second computer system that is remote from the vehicle, wherein the first message indicates the geographic position of the vehicle, the destination of the trip, the service, the plurality of service providers, and the one or more networks;

the global positioning device receiving a second message as a response to the first message, wherein the second message indicates a plurality of optimal itineraries generated by the second computer system;

the global positioning device extracting the plurality of optimal itineraries from the second message;

subsequent to the step of extracting the plurality of optimal itineraries, the global positioning device generating and displaying a plurality of choices identifying the plurality of optimal itineraries on a display device;

subsequent to the step of displaying the plurality of choices, the global positioning device receiving a selection by a user of a choice of the plurality of choices, wherein the selection identifies an optimal itinerary of the plurality of optimal itineraries, wherein the optimal itinerary is determined by the second computer system as including a sequence of a first path followed by a second path, a hop, an updated service provider of the plurality of service providers, and an updated network of the one or more networks, the hop indicating a position on the first path at which a connectivity change is to occur from an initial service provider providing the service to the updated service provider providing the service and from an initial network via which the service is provided to the mobile device to the updated network via which the service is provided to the mobile device, wherein the optimal itinerary is determined by the second computer system in part based on a first signal quality provided by the initial service provider to any mobile device in a second cell not being exceeded by any other signal quality indicated by any other measure of network connectivity included in a first plurality of measures of network connectivity and in part based on a second signal quality provided by the updated service provider to any mobile device in a third cell not being exceeded by any other signal quality indicated by any other measure of network connectivity included in a second plurality of measures of network connectivity, the second cell being included in a first plurality of cells adjacent to the first cell, wherein the first signal quality provided by the initial service provider to any mobile device in the second cell is indicated by a first measure of network connectivity included in the first plurality of measures of network connectivity, which is determined by the second computer system, wherein the second signal quality provided by the updated service provider to any mobile device in the third cell is indicated by a second measure of network connectivity included in the second plurality of measures of network connectivity, which is determined by the second computer system, wherein the second path is determined within the third cell by the second computer system, wherein the third cell is selected by the second computer system from a second plurality of cells adjacent to the second cell and the updated service provider is identified within the plurality of service providers by the second computer system, based on the second signal quality provided by the updated service provider to any other mobile device in the third cell not being exceeded by any other signal quality indicated by any other measure of network connectivity of the second plurality of measures of network connectivity, wherein the second plurality of measures of network connectivity is retrieved by the second computer system after the second computer system selects the second cell for each respective cell of the second plurality of cells adjacent to the second cell, each measure of network connectivity included in the second plurality of measures of network connectivity indicating a respective signal quality provided by a respective service provider of the plurality of service providers to any mobile device in a respective cell of the second plurality of cells adjacent to the second cell, wherein the first path is determined within the second cell by the second computer system, wherein the initial service provider is identified within the plurality of service providers and the second cell is selected from the first plurality of cells adjacent to the first cell by the second computer system, based on the first signal quality provided by the initial service provider to any mobile device in the second cell not being exceeded by any other signal quality indicated by any other measure of network connectivity of the first plurality of measures of network connectivity, and wherein the first plurality of measures of network connectivity is retrieved by the second computer system for each respective cell of the first plurality of cells adjacent to the first cell, each measure of network connectivity being included in the first plurality of measures of network connectivity and indicating a respective signal quality provided by a respective service provider of the plurality of service providers to any mobile device in the respective cell;

in response to the step of receiving the selection, the global positioning device storing the optimal itinerary in a computer memory;

the global positioning device detecting that the vehicle is located at the position indicated by the hop;

in response to the step of detecting that the vehicle is located at the position indicated by the hop, the global positioning device generating a third message indicating the updated service provider and the updated network; and the global positioning device sending the third message to the mobile device, wherein a result of the step of sending the third message and the step of receiving the selection identifying the optimal itinerary includes the mobile device making the connectivity change.

8. The program product of claim 7, wherein the step of sending the first message includes sending the first message that further indicates a time window during which the service is requested to be provided to the mobile device, wherein the result of the step of sending the third message includes the mobile device making the connectivity change based on the initial service provider and the initial network providing the service within the time window indicated by the first message and based on the updated service provider and the updated network providing the service within the time window indicated by the first message, and wherein the time window indicates a period of time during which the service is required by the mobile device.

9. The program product of claim 7, wherein the step of sending the first message includes sending the first message that indicates a cost requirement of the service, wherein the result of the step of sending the third message includes the mobile device making the connectivity change based on the initial service provider and the initial network providing the service at a first cost that does not exceed the cost requirement, and based on the updated service provider and the updated network providing the service at a second cost that does not exceed the cost requirement, and wherein the cost requirement indicates a maximum cost of providing the service to the mobile device.

10. A process for supporting computing infrastructure, the process comprising providing at least one support service for at least one of creating, integrating, hosting, maintaining, and deploying computer-readable code in a first computer system, wherein the code in combination with the first computer system is capable of performing a method of generating optimal itineraries, the method comprising the steps of:

a global positioning device receiving a destination of a vehicle on a trip, a service requested for a mobile device being transported by the vehicle, a plurality of service providers that provide the service, and one or more networks via which the plurality of service providers provide the service to the mobile device, the global positioning device being transported by the vehicle, the global positioning device being the first computer system, and the plurality of service providers providing the service to the mobile device in a first cell determined by a second computer system;

the global positioning device determining a geographic position of the vehicle;

subsequent to the step of receiving the destination and determining the position, the global positioning device sending a first message to the second computer system that is remote from the vehicle, wherein the first message indicates the geographic position of the vehicle, the destination of the trip, the service, the plurality of service providers, and the one or more networks;

the global positioning device receiving a second message as a response to the first message, wherein the second message indicates a plurality of optimal itineraries generated by the second computer system;

the global positioning device extracting the plurality of optimal itineraries from the second message;

subsequent to the step of extracting the plurality of optimal itineraries, the global positioning device generating and displaying a plurality of choices identifying the plurality of optimal itineraries on a display device;

subsequent to the step of displaying the plurality of choices, the global positioning device receiving a selection by a user of a choice of the plurality of choices, wherein the selection identifies an optimal itinerary of the plurality of optimal itineraries, wherein the optimal itinerary is determined by the second computer system as including a sequence of a first path followed by a second path, a hop, an updated service provider of the plurality of service providers, and an updated network of the one or more networks, the hop indicating a position on the first path at which a connectivity change is to occur from an initial service provider providing the service to the updated service provider providing the service and from an initial network via which the service is provided to the mobile device to the updated network via which the service is provided to the mobile device, wherein the optimal itinerary is determined by the second computer system in part based on a first signal quality provided by the initial service provider to any mobile device in a second cell not being exceeded by any other signal quality indicated by any other measure of network connectivity included in a first plurality of measures of network connectivity and in part based on a second signal quality provided by the updated service provider to any mobile device in a third cell not being exceeded by any other signal quality indicated by any other measure of network connectivity included in a second plurality of measures of network connectivity, the second cell being included in a first plurality of cells adjacent to the first cell, wherein the first signal quality provided by the initial service provider to any mobile device in the second cell is indicated by a first measure of network connectivity included in the first plurality of measures of network connectivity, which is determined by the second computer system, wherein the second signal quality provided by the updated service provider to any mobile device in the third cell is indicated by a second measure of network connectivity included in the second plurality of measures of network connectivity, which is determined by the second computer system, wherein the second path is determined within the third cell by the second computer system, wherein the third cell is selected by the second computer system from a second plurality of cells adjacent to the second cell and the updated service provider is identified within the plurality of service providers by the second computer system, based on the second signal quality provided by the updated service provider to any other mobile device in the third cell not being exceeded by any other signal quality indicated by any other measure of network connectivity of the second plurality of measures of network connectivity, wherein the second plurality of measures of network connectivity is retrieved by the second computer system after the second computer system selects the second cell for each respective cell of the second plurality of cells adjacent to the second cell, each measure of network connectivity included in the second plurality of measures of network connectivity indicating a respective signal quality provided by a respective service provider of the plurality of service providers to any mobile device in a respective cell of the second plurality of cells adjacent to the second cell, wherein the first path is determined within the second cell by the second computer system, wherein the initial service provider is identified within the plurality of service providers and the second cell is selected from the first plurality of cells adjacent to the first cell by the second computer system, based on the first signal quality provided by the initial service provider to any mobile device in the second cell not being exceeded by any other signal quality indicated by any other measure of network connectivity of the first plurality of measures of network connectivity, and wherein the first plurality of measures of network connectivity is retrieved by the second computer system for each respective cell of the first plurality of cells adjacent to the first cell, each measure of network connectivity being included in the first plurality of measures of network connectivity and indicating a respective signal quality provided by a respective service provider of the plurality of service providers to any mobile device in the respective cell;

in response to the step of receiving the selection, the global positioning device storing the optimal itinerary in a computer memory;

the global positioning device detecting that the vehicle is located at the position indicated by the hop;

in response to the step of detecting that the vehicle is located at the position indicated by the hop, the global positioning device generating a third message indicating the updated service provider and the updated network; and the global positioning device sending the third message to the mobile device, wherein a result of the step of sending the third message and the step of receiving the selection identifying the optimal itinerary includes the mobile device making the connectivity change.

11. The process of claim 10, wherein the step of sending the first message includes sending the first message that further indicates a time window during which the service is requested to be provided to the mobile device, wherein the result of the step of sending the third message includes the mobile device making the connectivity change based on the initial service provider and the initial network providing the service within the time window indicated by the first message and based on the updated service provider and the updated network providing the service within the time window indicated by the first message, and wherein the time window indicates a period of time during which the service is required by the mobile device.

12. The process of claim 10, wherein the step of sending the first message includes sending the first message that indicates a cost requirement of the service, wherein the result of the step of sending the third message includes the mobile device making the connectivity change based on the initial service provider and the initial network providing the service at a first cost that does not exceed the cost requirement, and based on the updated service provider and the updated network providing the service at a second cost that does not exceed the cost requirement, and wherein the cost requirement indicates a maximum cost of providing the service to the mobile device.

* * * * *